United States Patent
Somaiya et al.

(10) Patent No.: US 10,936,632 B2
(45) Date of Patent: Mar. 2, 2021

(54) ENHANCED SEARCH QUERY SUGGESTIONS

(71) Applicant: eBay Inc., San Jose, CA (US)

(72) Inventors: Manas Haribhai Somaiya, Sunnyvale, CA (US); Rajyashree Mukherjee, Fremont, CA (US); Shrish Mishra, Mountain View, CA (US); Fang-Hsiang Su, New York, NY (US)

(73) Assignee: EBAY INC., San Jose, CA (US)

( * ) Notice: Subject to any disclaimer, the term of this patent is extended or adjusted under 35 U.S.C. 154(b) by 956 days.

(21) Appl. No.: 14/818,034

(22) Filed: Aug. 4, 2015

(65) Prior Publication Data

US 2016/0078101 A1 Mar. 17, 2016

Related U.S. Application Data

(60) Provisional application No. 62/049,271, filed on Sep. 11, 2014.

(51) Int. Cl.
*G06F 16/332* (2019.01)
*G06F 16/9032* (2019.01)

(52) U.S. Cl.
CPC .... *G06F 16/3322* (2019.01); *G06F 16/90324* (2019.01)

(58) Field of Classification Search
CPC ............. G06F 17/3064; G06F 17/3097; G06F 16/90324; G06F 16/3322; G06F 16/9532; G06F 16/9535; G06F 16/9536
See application file for complete search history.

(56) References Cited

U.S. PATENT DOCUMENTS 8,601,015 B1 * 12/2013 Wolfram ............. G06F 17/3064
707/759
8,645,825 B1 2/2014 Cornea et al.
(Continued)

FOREIGN PATENT DOCUMENTS

CN 102982023 A 3/2013
CN 103064853 A 4/2013
(Continued)

OTHER PUBLICATIONS

"International Application Serial No. PCT/US2015/047460, International Search Report dated Nov. 23, 2015", 2 pgs.
(Continued)

*Primary Examiner* — William Spieler
(74) *Attorney, Agent, or Firm* — Shook, Hardy & Bacon L.L.P.

(57) ABSTRACT

In various example embodiments, a system and method for enhancing autocomplete search suggestions are presented. The system receives a query portion with a token portion from a client device and generates a first search query suggestion set having a first order based on the token portion. The system accesses a token pool associated with the client device and generates a second search query suggestion set having a second order based on the token portion and the token pool. The system selects a first subset of search query suggestions and a second subset of search query suggestions. The system merges the first subset of search query suggestions and the second subset of search query suggestions into a third search query suggestion set, organizes the third search query suggestion set into a third order distinct from the first and second orders, and causes presentation of the third search query suggestion set.

19 Claims, 10 Drawing Sheets

(56) References Cited

U.S. PATENT DOCUMENTS

| | | | |
|---|---|---|---|
| 9,116,952 | B1* | 8/2015 | Heiler .............. G06F 16/90328 |
| 2009/0327224 | A1 | 12/2009 | White et al. |
| 2011/0035403 | A1 | 2/2011 | Ismalon |
| 2011/0238645 | A1 | 9/2011 | Zhang et al. |
| 2012/0084291 | A1 | 4/2012 | Chung et al. |
| 2012/0239679 | A1 | 9/2012 | Gupta |
| 2013/0290291 | A1 | 10/2013 | Loofbourrow et al. |
| 2014/0108446 | A1 | 4/2014 | Djabarov |
| 2014/0156620 | A1 | 6/2014 | Gardner |
| 2015/0142770 | A1* | 5/2015 | Timm .................. G06F 16/285 707/706 |

FOREIGN PATENT DOCUMENTS

| | | |
|---|---|---|
| CN | 103729351 A | 4/2014 |
| WO | WO-2016040013 A1 | 3/2016 |

OTHER PUBLICATIONS

"International Application Serial No. PCT/US2015/047460, Written Opinion dated Nov. 23, 2015", 6 pgs.
"European Application Serial No. 15 839 776.0 Response to Communication pursuant to Rules 161(2) and 162 EPC dated Jun. 28, 2017", 21 pgs.
"International Application Serial No. PCT/US2015/047460, International Preliminary Report on Patentability dated Mar. 23, 2017", 8 pgs.
Final Office Action received for Korean Patent Application No. 10-2017-7009679, dated Apr. 23, 2019, 7 pages (4 pages of Official Copy and 3 pages of English Translation).
Office Action received for Korean Patent Application No. 10-2017-7009679, dated Oct. 22, 2018, 15 pages (8 pages of Official copy and 7 pages of English Translation).
Response to Office Action filed on Dec. 17, 2018 for Korean Patent Application No. 10-2017-7009679 dated Oct. 22, 2018, 26 pages (16 pages of Official Copy and 10 pages of English Pending Claims).
Extended European Search report received for European Patent Application No. 15839776.0, dated Mar. 20, 2018, 10 pages.
Response to European Search Report filed on Oct. 5, 2018, for European Patent Application No. 15839776.0 dated Mar. 20, 2018, 9 pages.
Office Action received for Canadian Patent Application No. 2,960,714, dated Jan. 3, 2018, 5 pages.
Office Action received for Canadian Patent Application No. 2,960,714, dated Oct. 10, 2018, 5 pages.
Response to Office Action filed on Apr. 3, 2019, for Canada Patent Application No. 2,960,714, dated Oct. 10, 2018, 22 pages.
Response to Office Action filed on May 4, 2018, for Canadian Application No. 2,960,714, dated Jan. 3, 2018, 14 pages.
First Examination Report received for Australian Patent Application No. 2015315634 dated Nov. 17, 2017, 3 pages.
Fourth Examination Report received for Australian Patent Application No. 2015315634, dated Jul. 31, 2018, 3 pages.
Response to First and Second Examiner Report filed on Mar. 28, 2018, for Australian Patent Application No. 2015315634, dated Nov. 17, 2017, 26 pages.
Response to Third Examination Report filed on Jun. 29, 2018, for Australia Patent Application No. 2015315634, dated May 4, 2018, 4 pages.
Second Examination Report received for Australia Patent Application No. 2015315634 dated Nov. 17, 2017, 3 pages.
Third Examination Report received for Australia Patent Application No. 2015315634, dated May 4, 2018, 4 pages.
Office Action received for Chinese Patent Application No. 201580061405.9, dated Oct. 8, 2019, 21 Pages (9 Pages of Official Copy and 12 Pages of English Translation).
Communication Pursuant to Article 94(3) EPC received for European Patent Application No. 15839776.0, dated Sep. 11, 2020, 9 pages.

* cited by examiner

US 10,936,632 B2

ENHANCED SEARCH QUERY SUGGESTIONS

RELATED APPLICATIONS

This application claims the priority benefit of U.S. Provisional Application No. 61/049,271, entitled "SYSTEMS AND METHODS TO ENHANCE SEARCH QUERY SUGGESTIONS," filed Sep. 11, 2014, which is hereby incorporated herein by reference in its entirety.

TECHNICAL FIELD

Embodiments of the present disclosure relate generally to generating search query suggestions and, more particularly, but not by way of limitation, to enhancing search query suggestions.

BACKGROUND

Conventionally, search queries have included search query suggestions provided to a user while the user is entering a search query into a search field. In some systems, search query suggestions are known as Auto Complete. Search query suggestions may be used to populate and formulate search queries by suggesting search queries stored in a search system. For example, search query suggestions may be populated by suggesting popular and well-known search queries stored in the search system. Search query suggestions often represent the search system determining suggested terms as related to the terms or partial terms input into the search query. Search systems commonly use global scoring functions to evaluate the overall performance of a search query across all users to rank the popularity and efficiency of a particular term or set of terms used in a search query.

BRIEF DESCRIPTION OF THE DRAWINGS

Various ones of the appended drawings merely illustrate example embodiments of the present disclosure and cannot be considered as limiting its scope.

Figure 1:
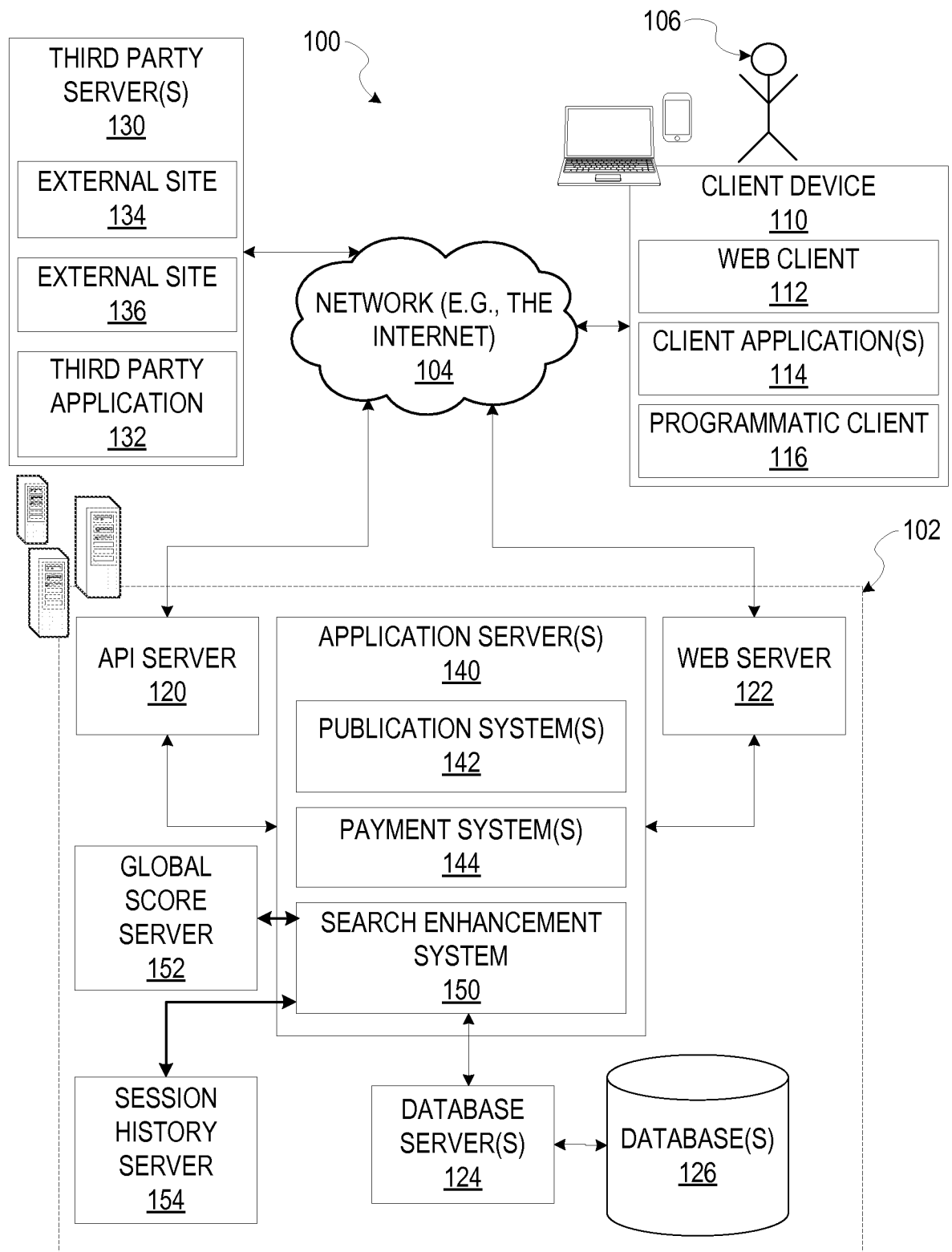
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Search query suggestions, also known as Auto Complete, are an important and integral part of any search system. The Auto Complete feature helps a user quickly populate and formulate her search queries via suggesting popular and well-known search queries from the search system. Such systems help reduce user friction, and help users converge faster to meaningful search queries, and hence satisfactory search results.

In various example embodiments, search query suggestions are enhanced and personalized to a user by a search enhancement system based on prior search queries entered by the user. The methods and systems employed by the search enhancement system to enhance search query suggestions may bias (e.g., expand, remove, and re-rank) the standard search query suggestions with the user's past search queries so as to bring more relevant and personalized search query suggestions. The user's preferences along several dimensions like brand, size, gender, etc. are already captured via her past searches. Utilizing this information and modifying the standard search query suggestions to take into account such implicit preferences may delight the user, and reduce her time to quickly reach relevant search queries. For example, if the user previously entered the search query "gucci handbag," responsive to typing "belt" in the search box a search query suggestion for "gucci belt" may be shown.

The search enhancement system may use a global scoring function that evaluates the overall performance of a search query across all users to rank its popularity and efficiency. For example, in some embodiments, the search enhancement system uses an advanced version of MostPopularCompletion, ranking all queries by popularity in a global history. Each history query is indexed and scored based on a popularity calculation model, part of a global scoring function. Frequency and other dimensions are incorporated in the popularity calculation. The search enhancement system may, upon entry of one or more search terms or partial terms into a data entry field, use previously entered search queries of the user to modify a set of suggested search query terms provided by the global scoring function. Users of a search system have their own preferences and intentions for search queries that may not be captured via such a global scoring function either because of their specificity or lack of popularity. For example, a search query "nike air," which is more general, may be more popular/useful than the specific search query "nike air size 8.5." The modification of the suggested search query terms provided by the global scoring function with the user's previous search queries may generate search query suggestions which reflect the preferences and intentions of the user.

The remainder of this document outlines methods and systems to enhance search query suggestions that operate by utilizing a user's past search queries to capture their personal preferences. This document further outlines how this data may be used within the search query suggestions system to surface more personalized and relevant search queries.

With reference to FIG. 1, an example embodiment of a high-level client-server-based network architecture 100 is shown. A networked system 102, in the example forms of a network-based publication system or payment system, provides server-side functionality via a communication network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on the client device 110.

The network architecture 100 is utilized to execute any of the methods described in this document. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for transactions relating to the network-based publication system. In some embodiments, the actions relating to product listings and publications can be understood as managing of digital goods. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each client device 110 may include one or more applications 114 (also referred to as "apps") such as, but not limited to, a web browser, messaging application, electronic mail (email) application, an e-commerce site application (also referred to as a publication application), and the like. In some embodiments, if the e-commerce site application is included in a given one of the client device 110, then this application 114 is configured to locally provide the user interface and at least some functionalities with the application 114 configured to communicate with the networked system 102, on an as needed basis, for data or processing capabilities not locally available (e.g., access to a database of items available for sale, to authenticate a user 106, to verify a method of payment, etc.). Conversely, if the e-commerce site application 114 is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, publication, or payment functions that are supported by the relevant applications of the networked system 102. The third party server(s) 130 may host external sites 134 and 136. The external sites 134 and 136 may be coupled to the network architecture 100 via the network 104 and may be any desired system, including ecommerce systems.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

In some example embodiments, the publication systems 142 publishes content on the network 104 (e.g., Internet). As such, the publication system 142 provides a number of publication and marketplace functions and services to users 106 that access the network architecture 100. The publication system 142 is discussed in more detail in connection to FIG. 7. In example embodiments, the publication system 142 is discussed in terms of an online marketplace environment. However, it is noted that the publication system 142 may be associated with a non-marketplace environment such as an informational (e.g., search engine) or social networking environment.

The payment system 144 provides a number of payment services and functions to the user 106. The payment system 144 allows the user 106 to accumulate value (e.g., in commercial currency, such as the U.S. dollar, or a proprietary currency, such as points, miles, or other forms of currency provided by a private entity) in their accounts, and then later redeem the accumulated value for products (e.g., goods or services) that are made available via the publication system 142 or elsewhere on the network 104 or the network architecture 100. The payment system 144 also facilitates payments and transactions from a payment mechanism (e.g., a bank account, PayPal™, or credit card) for purchases of items via any type and form of a network-based publication system.

The search enhancement system 150 provides functionality operable to enhance search query suggestions using prior search queries of the user 106 in combination with a global scoring function using search query histories of other users. For example, the search enhancement system 150 accesses the prior search queries of the user 106 from the databases 126, the third party servers 130, the publication system 142, and other sources. In some example embodiments, the search enhancement system 150 analyzes the prior search query history of the user 106 to determine user preferences and interests for enhancing search query suggestions. As more search queries are performed by the user 106, the search enhancement system 150 can further refine the personalization of the search query suggestions. In some example embodiments, the search enhancement system 150 communicates with the publication systems 142 and the third party servers 130 to access prior search histories for the user 106 across differing systems, services, or products. In an alternative embodiment, the search enhancement system 150 may be a part of the publication system 142, directly accessing the prior search history of the user 106 stored within the publication system 142.

In various example embodiments, a global score server 152 stores global scores for query items, queries, tokens, token portions, and the like. A global score represents the relevance of a query item in the pool of queries and query items. Query items may be understood as portions of a query, such as a keyword or portion of a keyword in a query. The global scores may be generated by the search enhancement system 150. In some instances, the global score server 152 may generate the global scores. In one embodiment, the global score server 152 may be implemented as a portion of the search enhancement system 150, instead of a standalone component.

In some instances, a session history server 154 stores session histories for a plurality of users (e.g., the user 106). In some example embodiments, the session history server 154 contains one or more data structures and memory components configured to store query items, query portions, tokens, token portions, and the like associated with each user 106 of the plurality of users 106. In some situations, the session history server 154 may additionally include data structures configured to store a global session history representative of the session histories and queries of all of the plurality of users 106. In some instances, the session history server 154 is implemented as a component of the search enhancement system 150.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
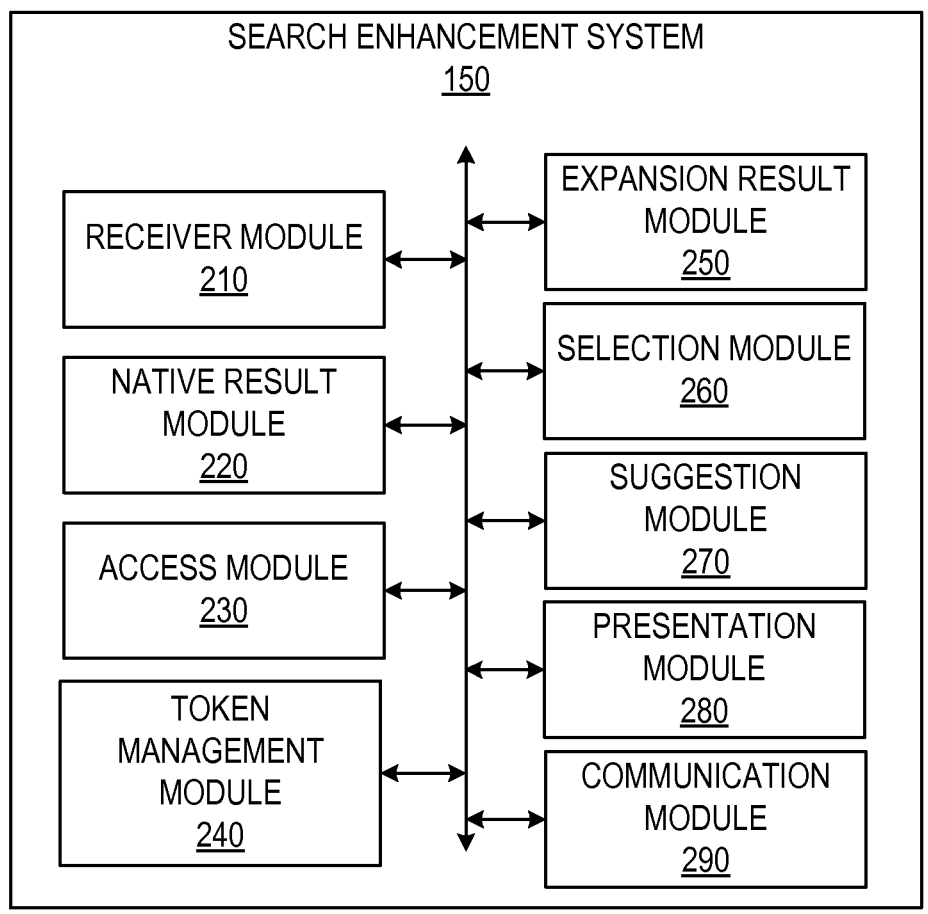
FIG. 2 is a block diagram of an example search enhancement system, according to various embodiments.

FIG. 2 is a block diagram illustrating components of the search enhancement system 150, according to some example embodiments. The search enhancement system 150 is shown as including a receiver module 210, a native result module 220, an access module 230, a token management module 240, an expansion result module 250, a selection module 260, a suggestion module 270, a presentation module 280, and a communication module 290. Any one or more of the modules described herein may be implemented using hardware (e.g., one or more processors of a machine) or a combination of hardware and software. For example, any module described herein may configure a processor (e.g., among one or more processors of a machine) to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

The receiver module 210 receives a query portion from the client device 110. The query portion may be understood to be all or a portion of a search query received from the client device 110. The query portion includes at least a token portion. The token portion may include all or a portion of a word, number, word set (e.g., sentence or paragraph), number set (e.g., string of numbers, telephone number, patent application number, or item listing identification number), and combinations thereof, for use in a search query. The token data represents a search query or represents tokens which may be combined with other tokens to form a search query. The client device 110 receives text strings from the user 106 via an input device of the client device 110. The receiver module 210 subsequently receives the text string from the client device 110 via the network 104. The receiver module 210 can be a hardware implemented module or a combination hardware-software implemented module. An example embodiment of components of the receiver module 210 is described with respect to the module described below in the section entitled "Modules, Components, and Logic."

The native result module 220 generates search query suggestions using the query portion received by the receiver module 210 and a global token pool. The global token pool may be understood to be a set of tokens, token portions, query portions, or search queries used by a set of users which interact with the search enhancement system 150. In some instances, the global token pool may include words and phrases not used by the set of users. For example, the global token pool can include tokens (e.g., words) found in dictionaries, thesauruses, encyclopedias, and other token reference sources. In some embodiments, the set of users includes the user 106. The native result module 220 can be a hardware implemented module or a combination hardware-software implemented module. An example embodiment of components of the native result module 220 is described with respect to the module described below in the section entitled "Modules, Components, and Logic."

The access module 230 accesses a token pool associated with the client device 110 from which the receiver module 210 received the token portion. The access module 230 may access the token pool associated with the client device 110 by accessing a storage device (e.g., memory or non-transitory machine-readable storage medium), a machine (e.g., a server), or other suitable repository capable of storing the token pool and its associations. In some embodiments, the access module 230 accesses the token pool via the network 104. In some instances, the access module 230 accesses the token pool within a storage device local to the search enhancement system 150. The access module 230 can be a hardware implemented module or a combination hardware-software implemented module. An example embodiment of components of the access module 230 is described with respect to the module described below in the section entitled "Modules, Components, and Logic."

The token management module 240 generally manages tokens received by the search enhancement system 150. In various example embodiments, the token management module 240 stores received query items, query portions, tokens, and token portions. The received data (e.g., query items, query portions, tokens, token portions) may be stored in one or more of a token pool associated with a user (e.g., the user 106) and a global token pool. In some embodiments, the global token pool is representative of the collective search query items and tokens of all users of one or more of the network-based publication system 142 and the search enhancement system 150. The token management module 240 determines token quality for each token of the token pool and associates the token quality determined for each respective token with each token of the token pool.

The expansion result module 250 generates search query suggestions using the query portion received by the receiver module 210 and the token pool associated with the client device 110. The token pool associated with the client device 110 may be understood, in some embodiments, to be a historical token pool including a set of historical tokens, token portions, query portions, or search queries received by the receiver module 210 from the client device 110 at a time prior to the receiver module 210 receiving the query portion. In some embodiments, the historical token pool is received within a user session including the query portion received by the receiver module 210. In some instances, the historical token pool is received in a separate user session from the query portion received by the receiver module 210. The historical token pool may include tokens and token portions received across a plurality of user sessions (e.g., the same user session as the query portion received by the receiver module 210 and one or more prior user sessions). The expansion result module 250 can be a hardware implemented module or a combination hardware-software implemented module. An example embodiment of components of the expansion result module 250 is described with respect to the module described below in the section entitled "Modules, Components, and Logic."

The selection module 260 selects a first subset and a second subset of the search query suggestions generated by the native result module 220 and the search query suggestions generated by the expansion result module 250. In some embodiments, the first subset of search query suggestions includes search query suggestions generated by the native result module 220 while the second subset of search query suggestions includes search query suggestions generated by the expansion result module 250. The selection module 260 may select equal or differing numbers of search query suggestions for each of the first subset and the second subset. In some instances, the number of search query suggestions included in the second subset of search query suggestions may be, at least in part, based on the number of search query suggestions in the first subset. The selection module 260 can be a hardware implemented module or a combination hardware-software implemented module. An example embodiment of components of the selection module 260 is described with respect to the module described below in the section entitled "Modules, Components, and Logic."

The suggestion module 270 merges the first subset of search query suggestions and the second subset of search query suggestions and organizes the combined subsets of search query suggestions into an order. In some embodiments, the order of the combined subsets of search query suggestions differs from an order of the first subset and an order of the second subset. For example, the suggestion module 270 may intersperse one or more search query suggestions of the second subset among the search query suggestions of the first subset. The suggestion module 270 can be a hardware implemented module or a combination hardware-software implemented module. An example embodiment of components of the suggestion module 270 is described with respect to the module described below in the section entitled "Modules, Components, and Logic."

The presentation module 280 causes presentation of the combined search query suggestions according to the order determined by the suggestion module 270. For example, the presentation module 280 generates a set of user interface elements, screens, frames, or the like, for presentation at the client device 110. The presentation module 280 causes presentation of the combined search query suggestions on the user interface of the client device 110. In some embodiments, the presentation module 280 can cause presentation of the combined search query suggestions by transmitting the combined search query suggestions to the client device 110. The presentation module 280 can be a hardware implemented module or a combination hardware-software implemented module. An example embodiment of components of the presentation module 280 is described with respect to the module described below in the section entitled "Modules, Components, and Logic."

The communication module 290 enables communication between the client device 110, the search enhancement system 150, the publication system(s) 142, and any other suitable systems. In some example embodiments, the communication module 290 enables communication among the receiver module 210, the native result module 220, the access module 230, the token management module 240, the expansion result module 250, the selection module 260, the suggestion module 270, and the presentation module 280. The communication module 290 can be a hardware-implemented module, a software-implemented module, or a combination thereof, as described in more detail below. For example, the communication module 290 can include communication mechanisms such as an antenna, a transmitter, one or more busses, and other suitable communication mechanisms capable of enabling communication between the modules 210-280, the client device 110, the search enhancement system 150, and the publication system(s) 142. The communication module 290 can be a hardware-implemented module, a software-implemented module, or a combination thereof. An example embodiment of components of the communication module 290 is described with respect to the module described below in the section entitled "Modules, Components, and Logic."

In some embodiments and combinations of embodiments, described in more detail below, the modules of the search enhancement system operate together to perform operations, represented below by pseudo code, including

```
Data: A query string in the search, q. This string can be a
prefix, token or a complete query.
Result: A list of queries relevant to q for auto-completion
NQ = retrieveQAC(q);
initializeEQ;
candidateRequests = expand(q);
for c in candidateRequests do
      | EQ.addAll(retrieveQAC(c));
end
EQ' = selection(EQ);
boostRank(EQ');
AQ = merge(NQ, EQ');
return AQ;
```

In the pseudo code above, as will be explained in more detail below by way of the figures and description of the varied embodiments, NQ is a native queue, QAC is a Query auto-completion, and q is a current query. As shown in the example pseudo code above, each query of the user 106 is parsed into tokens. The search enhancement system 150 may perform word filtering, to clean tokens, and stores them in the token pool, which may record and track tokens with importance in a session.

Figure 3:
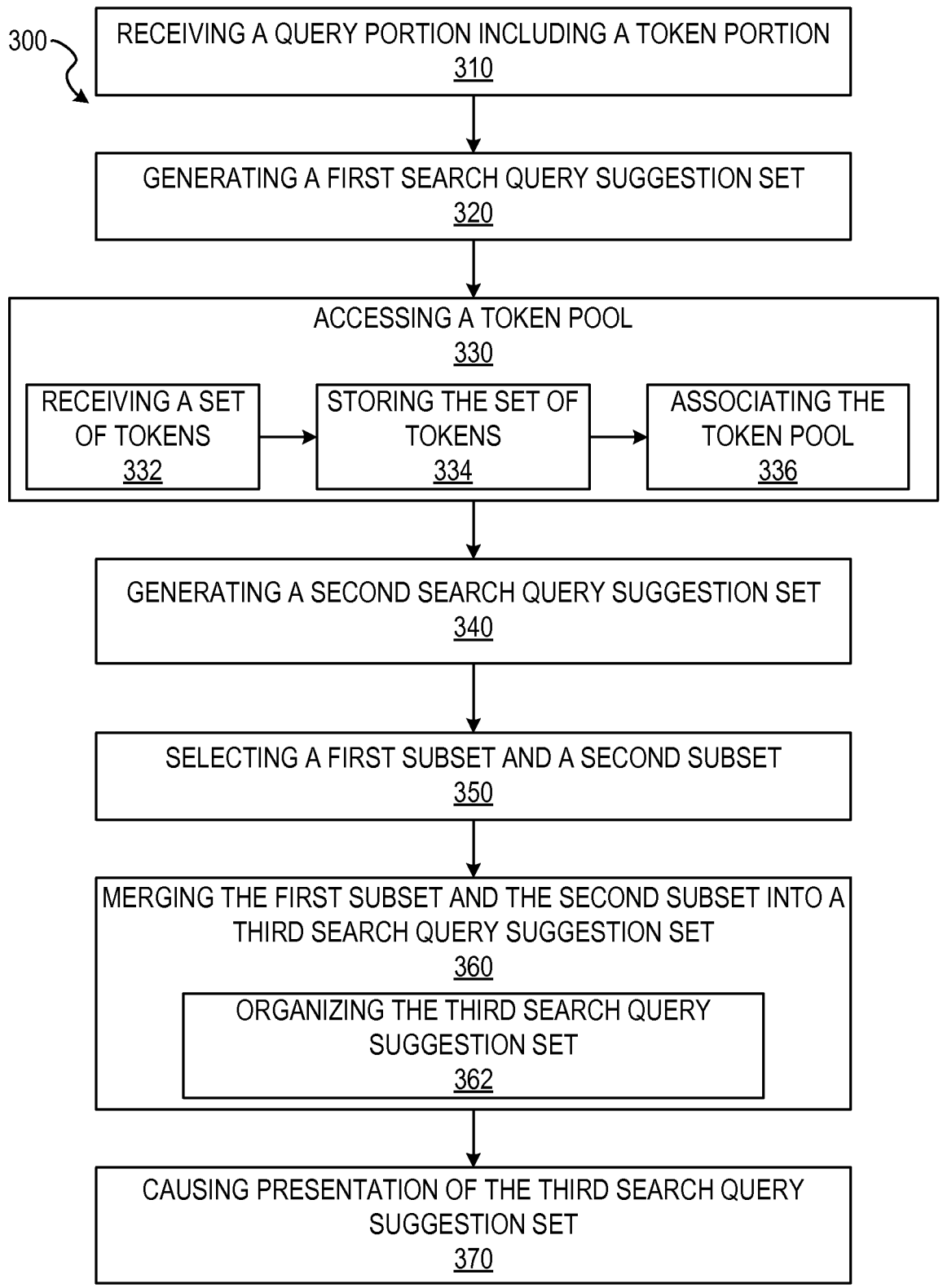
FIG. 3 is a flow diagram illustrating an example method for generating and providing a search query suggestion set, according to various embodiments.

FIG. 3 is a flowchart of operations of the search enhancement system 150 in performing a method 300 of enhancing search query suggestions, according to some example embodiments. Operations in the method 300 are performed by the search enhancement system 150, using modules described above with respect to FIG. 2 and hardware (e.g., processors, servers, computing environments, etc.) described below.

In operation 310, the receiver module 210 receives a query portion including at least a token portion from the client device 110. In various example embodiments, the receiver module 210 receives the query portion from the client device 110 via the network 104. For example, the receiver module 210 may be a port, a server, or any other mechanism capable of receiving the query or query portion from the client device 110. The receiver module 210 may receive the query portion in the form of n token represented as q.tok[1 . . . n]. The method 300 may be initiated responsive to the user 106 issuing a query, query portion, token, or token portion from any device (e.g., the client device 110). In some example embodiments, in addition to the query portion, the receiver module 210, in the form of a web server 122, receives a request for query suggestions for autocompletion. The receiver module 210 forwards the request for query suggestions to other modules within the search enhancement system 150. For example, the receiver module 210 may forward the request to the native result module 220, described in more detail below.

A query is a set of words used by users 106 and received by a search engine to search for her desired items, according to an embodiment. For example, "prada eyeglasses" may be a user query that is received by a search engine and processed by the search engine to search for the user 106's desired eyeglasses under the brand of Prada. In at least some example embodiments, the present disclosure uses q as the representative of query in the following paragraphs. In some instances, "prada eyeglasses" may be a query portion to which the user 106 will add additional query portions in order to form a full query. A query portion may be understood as a part of a query. In some instances, the query portion is a fully formed query, while in other instances, the query portion is less than the fully formed query. As stated above, the query portion includes at least a token portion received from the client device 110.

A token is understood to be a sub-list of words in the query or the query portion, according to various example embodiments. For example, the query portion "prada eyeglasses" has three tokens: "prada", "eyeglasses" and "prada eyeglasses." The present disclosure, for various example embodiments, will use t as the representative of token in the following paragraphs. Namely, q is a list of t. For convenience, the present disclosure uses q.tok[1.1] to represent the sub-list of tokens from 1 to i in q. A token portion may be understood as a portion or fragment of a token. For example, where the token is "eyeglasses" a token portion is a part of the term, such as "eye" or "eyegl." The operation 310 may be initiated prior to receiving the full query or the token. As such, in some example embodiments, the operation 310 may be initiated upon receiving the smallest operable set of characters (e.g., token portion) on which the search enhancement system 150 may generate a search query suggestion.

In operation 320, the native result module 220 generates a first search query suggestion set based on the token portion. The native result module 220 may perform the operation 320 based on receiving the request for query suggestions from the receiver module 210. The first search query suggestion set includes a first suggested token set in a first order. In various example embodiments, the first search query suggestion set is a native queue of autocomplete results. The native queue may be generated by a global scoring function, described in more detail below. For example, if a user 106 queries "prada," the native queue may include the top n query suggestions relevant to "prada" as determined by the global scoring function. In other words, the native queue contains the result offered initially by an autocomplete system. For convenience, the present disclosure uses NQ[i] to represent the $i^{th}$ query item in NQ. NQ[last] represents the last query suggestion in NQ.

The native result module 220 may be implemented as a server (e.g., an autocomplete server) configured to receive queries or query portions, generate query suggestion sets (e.g., native queues), and transmit the query suggestion sets to the client device 110 or to one or more other modules of the search enhancement system 150. In some example embodiments, the native result module 220 is implemented as a native result server logically or physically separate from the expansion result module 250 (e.g., an expansion result server). In some instances, the native result module 220 is implemented on the same server equipment as the expansion result module 250 (e.g., the expansion result server). Example hardware capable of forming the basis of an implementation of the native result server is described below with respect to the machine of FIG. 10.

In operation 330, the access module 230 accesses a token pool associated with the client device 110. In some instances, the access module 230 accesses the token pool by accessing a token pool database, or a token pool table on a database 126. In some example embodiments, the token pool database is stored on the session history server 154 and the access module 230 queries or otherwise accesses the session history server 154 to access the token pool. After accessing the session history server 154, the access module 230 retrieves all or a part of the session history (e.g., query history or token pool) for the user 106 and the tokens stored therein. In some instances, the access module 230 is implemented as one or more of a port of a server, a server, or any other suitable mechanism capable of accessing or being configured by software to access the token pool. In some example embodiments, the access module 230 is prompted to access the token pool on the session history server 154 by the receiver module 210 passing the request for query suggestions.

In various embodiments, the token pool is a pool that records tokens or token portions in a session history of a user (e.g., the user 106), according to an embodiment. The token pool may provide tokens with a quality (e.g., a high quality). There may be multiple methods to define the quality for a token. Features that a token (e.g., token features) has may be marked as t.features, so the quality of a token may be formulated as t.quality=tQu(t.features). The token pool may provide tokens based on any selection strategy (e.g., all tokens, top n tokens with high quality, randomly select n tokens in the pool). In various embodiments, tokens within the token pool may be associated with one or more client devices 110, users 106, or combinations thereof. For example, the token pool, in the form of a token pool table, may be linked to one or more association data structures (e.g., an association database, an association table, etc.) containing representations of the associations among the tokens of the token pool and the client devices 110 or users 106. In some instances, the token pool may be distributed among session histories of individual users 106 or client devices 110. In some embodiments of these instances, identical tokens of the token pool may be stored in the session history of each user 106 or client device 110 with which the token is associated.

The session history is a record of a user 106's historical queries, according to various embodiments. There may be several strategies to record a user 106's session history, (e.g., store every query record since the first time this user 106 used the system, store query records from the past n days/months/years). The storage location of the session history may vary, (e.g., stored on the client side (computers, mobile devices), stored on the server side, or stored on intermediate devices). The strategy to transmit a query history to a storage location may also have multiple implementations, (e.g., transmitting the user query history immediately, transmitting the user query history on client side first and periodically sending history back to session history server 154).

In various example embodiments, token features may be understood to be aspects of a token or query item within the token pool. An example of a token feature may be the usage time of the token in the session history. Token features may also include token frequency, token recency, and other features recordable when the token or query item is received into the token pool. Token frequency is a metric used to describe how prominently a specific token appears in the session history, according to various embodiments. Token frequency may be determined using a multitude of strategies. For example, the token frequency is determined as the frequency of a specific token in the session history. The token frequency may also be determined as a normalized form of the frequency of a specific token in the session history. Token frequency is represented in the present disclosure as t.freq.

Token recency may be understood as a metric describing how recently a token was used by the user 106 in the session history. Where token recency is used in the context of the global pool of a plurality of users 106, the token recency may represent how recently the token was used by any user 106. In some instances, token recency is determined by the latest occurrence of a specified token in the session history or a normalized value thereof. The token management module 240, the expansion result module 250, or the native result module 220 may determine token recency in part by a time value associated with the token or query item in the token pool or global token pool. The time value may indicate a time at which the token was used by a user (e.g., the user 106). Token recency may be represented as t.rec.

In various example embodiments, accessing the token pool includes additional functions. For example, as shown in FIG. 3, the operation 330 includes operation 332 in which the receiver module 210 receives a set of tokens forming a search query.

In operation 334, the token management module 240 stores the set of tokens to form the token pool. In various example embodiments, the token management module 240 stores the set of tokens in a data structure and data storage device associated with the session history server 154. For example, the token management module 240 stores the set of tokens in a token table associated with the user 106 and includes values representing one or more of the features for each token of the set of tokens. The data structure (e.g., data table) in which the set of tokens is stored may be part of one or more servers of the search enhancement system 150, such as the session history server 154.

In operation 336, the token management module 240 associates the token pool with one or more of the user 106 and the client device 110 associated with the user 106. The token management module 240 may associate the token pool by modifying values within the data structure representative of the token pool. In various embodiments, the token management module 240 creates or modifies metadata indicative of the association between the token pool and the user 106.

In operation 340, the expansion result module 250 generates a second search query suggestion set based on the token portion and the token pool. In some embodiments, the second search query suggestion set includes a second suggested token set in a second order. The expansion result module 250 may be implemented as a server (e.g., an expansion result server), as a logical component of the server on which the native result module 220 is implemented (e.g., the autocomplete server), or any other suitable hardware. The second search query suggestion set is an expansion queue (EQ) representing additional autocomplete results predicted/expanded by the search enhancement system 150 to enhance search query suggestions (e.g., the native queue), according to various example embodiments. The expansion queue may be merged with the native queue to generate the final autocomplete results for users 106. For convenience, the expansion queue is depicted in the present disclosure as EQ[j] to represent the jth query suggestion in EQ.

Generating the expansion queue may be understood as an expansion operation in which the search enhancement system 150 enhances search query suggestions (e.g., the native queue) by first expanding the user query based on her session history and token pool. The search enhancement system 150 utilizing multiple expansion strategies to enhance search query suggestions based on selections, parameters, or desires of the system developer. For example, the search enhancement system 150 may prepend or append tokens from token pool to the current query, prepend or append token portions to complete token portions received in the operation 310, insert tokens in the middle of query, using synonyms or stemming of the token, concatenating a query in history to the current query, or other suitable expansion strategies. The search enhancement system 150 may use these expansion strategies to expand the current query to a list of potential queries. For each potential query, the search enhancement system 150 may retrieve corresponding query suggestion results from the session history server 154.

In various example embodiments, the operation 340 includes one or more cleaning functions. The cleaning functions can include any query cleaning techniques. For example, the search enhancement system 150 may use one or more of trimming, stemming, and stop word filtering. The cleaning functions remove extraneous tokens or token portions from the query or query portion.

In operation 350, the selection module 260 selects a first subset of search query suggestions and a second subset of search query suggestions. In various instances, the first subset of search query suggestions is selected from the first search query suggestion set and the second subset of search query suggestions is selected from the second search query suggestions set. The selection module 260 may be implemented as a server, such as in the expansion result server.

Selecting the first subset of search query suggestions and the second subset of search query suggestions can be understood as a selection function. In some example embodiments, the selection function includes a selection scoring function. The selection scoring function may be utilized by the search enhancement system 150 to evaluate whether a query suggestion is potentially listed in the final autocomplete queue or not. The scoring function, according to an embodiment, may be as follows:

$$q.ss = s(q.\text{score}, q.\text{imp}, \text{otherFactors})$$

The scoring function determines if a query suggestion from the expansion queue should be selected into the second subset of search query suggestions from the second set of search query suggestions (e.g., the expansion queue). In some example embodiments, the scoring function may be used to determine if a query suggestion from the native queue should be selected into the first subset of search query suggestions from the first set of search query suggestions (e.g., the native queue). Using the scoring function, the selection module 260 determines if a query item represents a comparatively more important token than other queries from the expansion queue or the native queue. The scoring function enables the selection module 260 to determine whether the global score is higher than other queries from the expansion queue or the native queue. The selection module 260 may then select the represented token for inclusion in the second subset of search query suggestions or the first subset of search query suggestions based on one or more of the relative importance of the represented token and the global score of the represented token.

In various example embodiments, token importance represents the importance of a token with respect to the query portion received by the receiver module 210 in the operation 310. The token importance may be determined based on the token factors, such as token frequency and token recency. In some embodiments, token importance is represented by t.imp and may be a function of t.freq, t.rec, and other factors. As such, in at least some embodiments, token importance may be determined using the equation:

$$t.\text{imp} = t\text{Imp}(t.\text{freq}, t.\text{rec}, \text{otherFactors}).$$

Query importance is related to token importance, in various embodiments. The query importance may be represented as q.imp, as shown above with respect to the scoring function. The query importance may be determined through the function:

$$q.\text{imp} = q\text{Imp}(t.\text{imp}, \text{otherFactors}).$$

In some example embodiments, after calculating the selection score for each query suggestion, the selection module 260 of the search enhancement system 150 employs a filter function to select qualified query items for inclusion in the first subset of search query suggestions or the second subset of search query suggestions. The filter function may be represented as follows:

$$EQ' = \text{filter}(EQ, NQ, \text{otherFactors}).$$

Selected query items may include qualified query suggestions, discussed in more detail below. The selected query items to be included in the second subset of search query suggestions may be represented by EQ'. In some embodiments, a maximum number of selected query items for EQ' is controlled. For example the selected query items may be limited by a predetermined number prior to operation of the search enhancement system 150.

The query items selected for inclusion from the second set of search query suggestions may be placed in the second subset of search query suggestions. For example, the selected query items may be stored in memory (e.g., RAM) of the autocomplete server for further use in the method 300. In some example embodiments, the selected query items are stored in the session history server 154 along with a reference to the associated client device 110 or a session identifier. Similarly, in embodiments where the selection module 260 selects query items from the first set of search query suggestions, the selection module 260 may place the selected query items into the first subset of search query suggestions to be similarly stored in the memory of the autocomplete server or the session history server 154.

In operation 360, the suggestion module 270 merges the first subset of search query suggestions and the second subset of search query suggestions to form a third search query suggestion set. In various example embodiments, the suggestion module 270 organizes the third search query suggestion set in a third order distinct from the first order and the second order. The suggestion module 270 may be implemented as a server or on a server, such as the autocomplete server.

The suggestion module 270 may receive the first subset of search query suggestions and the second subset of search query suggestions from the selection module 260. In some embodiments, the suggestion module 270 may receive data representative of the first subset of search query suggestions and the second subset of search query suggestions. For example, the suggestion module 270 receives an indicator representing a location in a data structure (e.g., a memory location in a server, database 126, or data table) for each of the query items of the first and second subsets of search query suggestions. In this embodiment, the suggestion module 270 (e.g., a suggestion server) accesses or otherwise retrieves the query items of the first and second subsets of search query suggestions prior to merging the first and second subset of search query suggestions.

Merging the first subset of search query suggestions and the second subset of search query suggestions may be understood as a merge state or a merging function. In the merge state, the search enhancement system 150 combines the NQ (e.g., native queue) and the EQ (e.g., expansion queue) into the third search query suggestion set. As such, the third search query suggestion set is an autocomplete queue (AQ). In various example embodiments, the autocomplete queue is a final queue, resulting from merging the NQ and the EQ. The AQ may be offered by the search enhancement system 150 for consideration by the user 106 at the client device 110.

The merging function may merge the first subset of search query suggestions and the second subset of search query suggestions according to various merging strategies. For example, the suggestion module 270 may merge the first and second subset of search query suggestions by randomly inserting query items from the first and second subset of search query suggestions into a list, by generating an ordered list, by placing the second subset of search query suggestions in an ordered list above the first subset of search query suggestions, by ordering the query items of the first and second subsets of search query suggestions based on a global score, or other suitable merging or ordering methods. One merging example may include first selecting the top m query items from the NQ and top n query items from the EQ, merging them into the AQ, and placing n query suggestions from the EQ' in the end of AQ, temporarily. The final position of the EQ' in the AQ may be determined by a boosting function, described in more detail below.

In various example embodiments, as will be described in more detail below, the top m queries are determined by global scores exceeding a predetermined or relative threshold. A selection process of the top m queries may be represented as:

$$NQ'=\{qs|qs \in NQ, qs.gs \geq NQ[m].gs\}$$

As shown above, NQ[m] represents the $m^{th}$ query suggestion in NQ. In some example embodiments, the selection process for the top n query items may be represented as:

$$EQ'=\{qs|qs \in EQ, qs.\text{finalRank} \leq EQ[n].\text{finalRank}\}$$

In this embodiment, the EQ'[n] represents the $n_{th}$ query suggestion selected for EQ'.

As noted above, the operation 360 of merging the first and second subsets of search query suggestions may include one or more organization operations. In various example embodiments, the operation 360 includes the operation 362 in which the suggestion module 270 organizes the third search query suggestion set (e.g., AQ) in the third order distinct from the first order of the first search query suggestion set and the second order of the second search query suggestion set. Example embodiments of organization methods are discussed in further detail below.

In operation 370, the presentation module 280 causes presentation of the third search query suggestion set (e.g., AQ) in the third order at the client device 110. In various example embodiments, the presentation module 280 causes presentation of the third search query suggestion set by transmitting the third search query suggestion set to the client device 110.

In causing presentation of the third search query suggestion set, the client device 110 or the presentation module 280 cause one or more user perceivable user interface elements to be generated and presented to the user 106. For example, the third search query suggestion set may be generated as visible user interface elements on the user interface of the client device 110 proximate to the query portion or the token portion entered into the user interface. In some example embodiments, query items of the third search query suggestion set are presented as audible user interface elements at the user interface, played through an audio output device, or through other user perceivable methods of presentation. The one or more user perceivable user interface elements may be selectable user interface elements, such that upon selecting (e.g., touching a touch screen proximate to a query item, clicking on or proximate to a query item, directing a cursor to a query item) a selectable user interface element, the query item associated with the selectable user interface element is entered into a data entry field in which the query portion or the token portion has been entered. In some instances, the query item being entered into the data entry field replaces the query portion or token portion, extends or completes the query portion or token portion, or is entered in addition to the query portion or token portion.

In some example embodiments, the search enhancement system 150 employs an n-gram model to reduce workload on the server, by eliminating unlikely candidate queries. The n-gram model may operate as an optimization heuristic reducing workload on the servers described herein and improving response time of the search enhancement system 150.

An n-gram is a sequence of n tokens appearing in a given set of documents (e.g., queries). The search enhancement system 150 may be evaluated using a bigram (n=2) model to check a joint of an expanded query. If the joint of among queries (e.g., queries which may be candidates for inclusion in the expanded queue) exists in the bigram model, the query may be used to request more queries for final merging. If the joint among the queries does not exist in the bigram model, the query being tested may be excluded from the expanded queue. For example, if a current query is ab and this query is expanded to abc by a token c, the search enhancement system 150 checks whether the joint be exists in the bigram model.

The n-gram model may record n-grams and frequencies of the n-grams in the set of documents. In some embodiments, to limit a number of query suggestions for the expanded queue to those query suggestions with a relative frequency, as compared to other query suggestions, the bigram model is limited. For example, the bigram model may be limited to a predetermined percentage. In order to limit the bigram model to a percentage, for a bigram model limited to k bigrams given a percentage of 1%, the search enhancement system sorts all bigrams by frequencies in the bigram model, picks the bigram with the ranking 1%*k as a pivot, and selects all bigrams with frequencies greater than or equal to the pivot. The limitation of the bigram model may have the effect of limiting the expanded queue of query suggestions. For example, in some instances, the bigram model is limited to between 0.5% and 20% to balance a server workload and network communications workload (e.g., bandwidth) with the inclusiveness of the AQ. Additionally, in some embodiments, the search enhancement system 150 is limited to a predetermined number of query suggestions for the native queue to increase performance times of the search enhancement system 150 with respect to executing auto-complete suggestions. Limiting the number of query suggestions for the native queue, the search enhancement system 150 sorts query suggestions to submit the number of suggestions to those representing the top percentage of query suggestions. In some instances the percentage of the bigram model may be controlled with respect to frequencies of queries or tokens to be selected for inclusion in the suggested queries.

Figure 4:
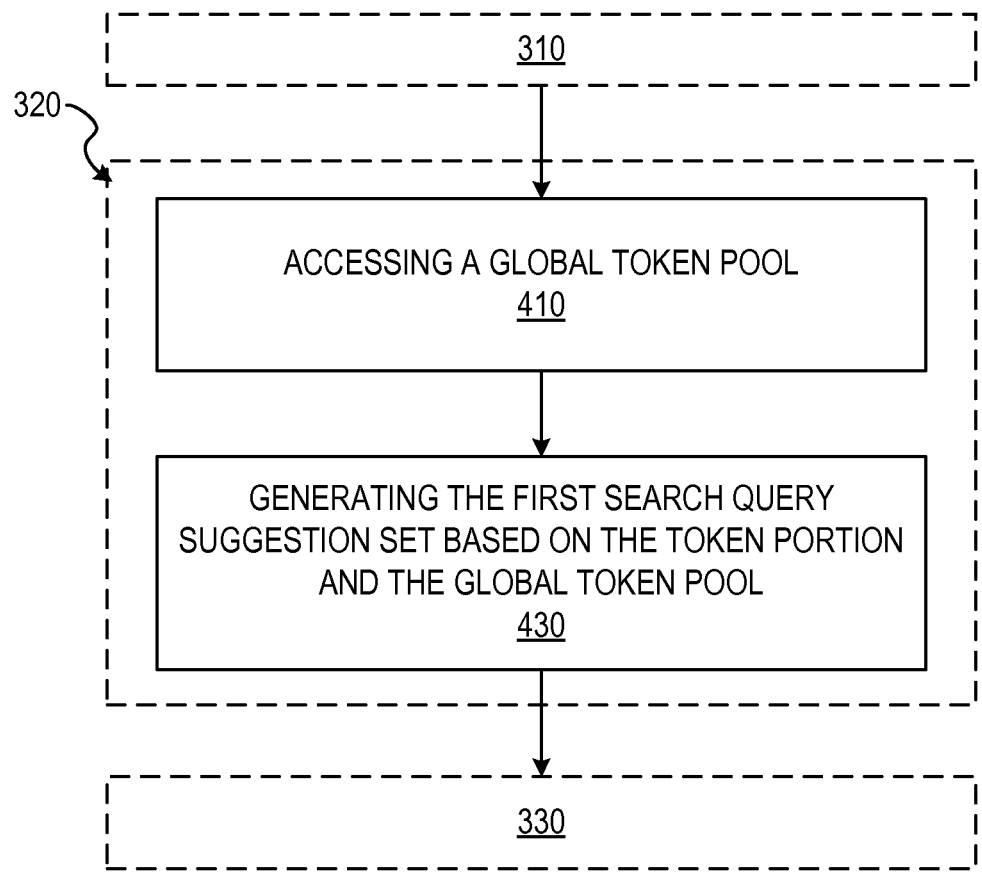
FIG. 4 is a flow diagram illustrating an example method for generating and providing a search query suggestion set, according to various embodiments.

FIG. 4 is a flowchart of operations of the search enhancement system 150 in performing the operation 320 of generating the first search result query suggestion set, according to various example embodiments. The operations depicted in FIG. 4 may be performed by the search enhancement system 150, using modules described above with respect to FIG. 2 and hardware described below with respect to FIG. 10.

In some example embodiments, the client device 110 is a first client device of a set of client devices. In operation 410, the access module 230 accesses a global token pool associated with the set of client devices. The access module 230 may access the global token pool similarly to the access module 230 accessing the token pool for the client device in operation 330. The global token pool may be understood as a global pool recording tokens or token portions in one or more session histories of the set of client devices. In some instances, each client device of the set of client devices has one or more associated session history records, with each session history record having one or more query items representative of a query history.

In operation 420, the native result module 220 generates the first search query suggestion set based on the token portion and the global token pool. In at least some embodiments, using the global token pool, the native result module 220 calculates a global score for each query item. The global score of a query item is calculated by a global scoring function for the query. As discussed in the present disclosure, the global score for a query is represented as q.score. The global score may represent the relevance of a query item in the global token pool, or the token pool for the user 106, with respect to the query portion received by the receiver module 210 in the operation 310. The features of the query item being scored are represented by q.features. As such, in various example embodiments, the global scoring function may be represented by the equation:

$$q.score = gs(q.features).$$

Figure 5:
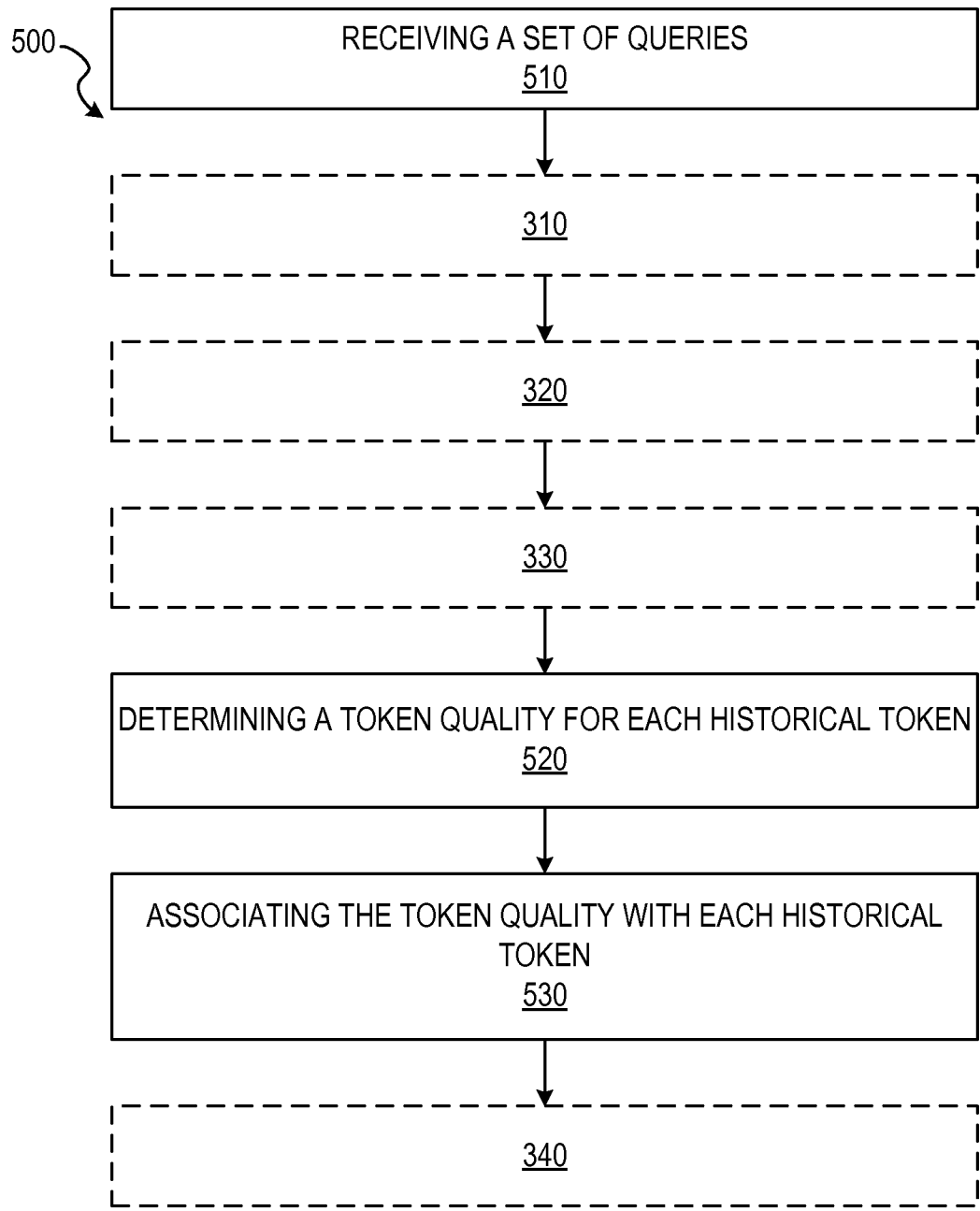
FIG. 5 is a flow diagram illustrating an example method for generating and providing a search query suggestion set, according to various embodiments.

FIG. 5 is a flowchart of operations of the search enhancement system 150 in performing a method 500 of enhancing search query suggestions, according to some example embodiments. Operations in the method 500 may be performed by the search enhancement system 150 using modules described above with respect to FIG. 2 and hardware described below with respect to FIG. 10. As shown in FIG. 5, the method 500 includes one or more operations of the method 300, described above with respect to FIG. 3.

In operation 510, the receiver module 210 receives a set of queries from the client device 110. The set of queries represent a set of historical queries. Each query of the set of historical queries includes a set of historical tokens. In at least some instances, the set of historical tokens of each query of the set of historical queries forms the token pool. For example, the token pool associated with the client device 110 may be populated over time by the receiver module 210 receiving successive sets of queries from the client device 110. Each historical token includes one or more features. As discussed above, features for historical tokens may include usage time of the token, semantic relation of the token to other tokens or query items, a query time, and other suitable features which may indicate relative placement of tokens or query items within the token pool and relationships between tokens or query items within the token pool.

In various example embodiments, after receiving the query portion in operation 310, generating the first search query suggestion set in operation 320, and accessing the token pool in operation 330, in operation 520, the token management module 240 determines a token quality for each historical token of the token pool.

In operation 530, the token management module 240 associates the token quality with each historical token of the token pool. In various instances, the token management module 240 makes this association on a temporary basis for generating the second search query suggestion set in operation 340. After associating the token quality with each token in the token pool, the expansion result module 250 may generate the second search query suggestion set with tokens having a token quality above a predetermined quality threshold.

Figure 6:
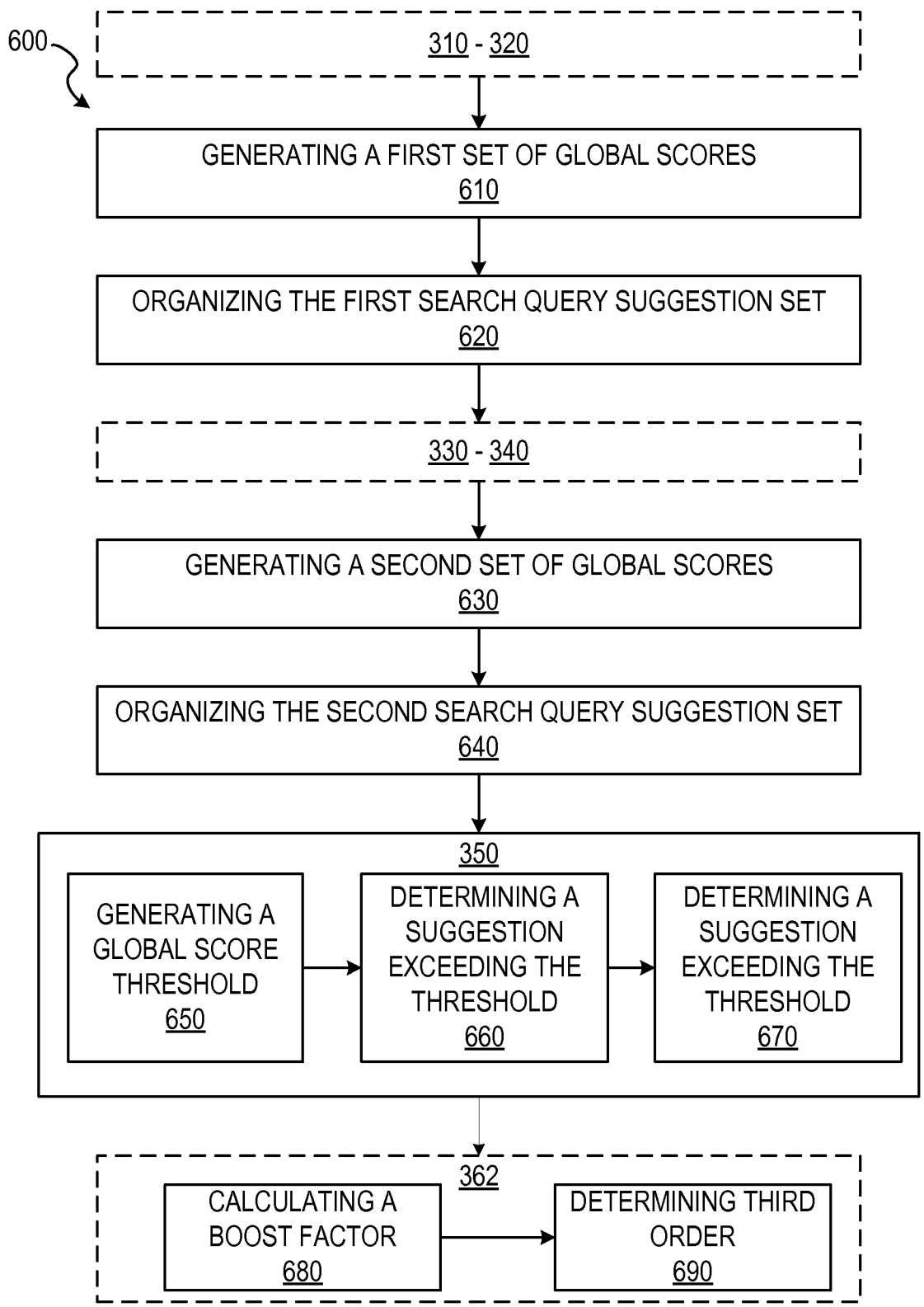
FIG. 6 is a flow diagram illustrating an example method for generating and providing a search query suggestion set, according to various embodiments.

FIG. 6 is a flowchart of operations of the search enhancement system 150 in performing a method 600 of enhancing search query suggestions, according to some example embodiments. Operations in the method 600 may be performed by the search enhancement system 150 using modules described above with respect to FIG. 2 and hardware described below with respect to FIG. 10. As shown in FIG. 6, the method 600 includes one or more operations of the method 300, described above with respect to FIG. 3.

In various example embodiments, the method 600 is initially performed by receiving a query portion in the operation 310 and the operation 320, as shown in FIG. 6. In operation 610, the native result module 220 generates a first set of global scores. Each global score of the first set of global scores is associated with a search query suggestion (e.g., query item, token, or token portion) of the first search query suggestion set. In various example embodiments, the native result module 220 generates the first set of global scores for the query suggestions in a manner similar to the operation 420.

In operation 620, the native result module 220 organizes the first search query suggestion set in the first order based on the first set of global scores. The first order may be determined by one or more of the global score (e.g., query suggestions ranked by global score), semantic relation, random order, a combination thereof, or any other suitable organization method. In various instances, the native result module 220 stores the first search query suggestion set, in the first order or including a reference thereto, in volatile or temporary memory of the search enhancement system 150.

In various example embodiments, the method 600 is then performed by accessing the token pool in the operation 330 and operation 340. In operation 630, the expansion result module 250 generates a second set of global scores. Each global score of the second set of global scores is associated with a search query suggestion (e.g., query item, token, or token portion) of the second search query suggestion set. The second set of global scores may be generated similarly to, or the same as, the operation 420, described above.

In operation 640, the expansion result module 250 organizes the second search query suggestion set in the second order based on the second set of global scores. The second search query suggestion set may be organized based on the second set of global scores, the semantic relation of the query suggestions to the query portion, combinations thereof, or any other suitable method.

As shown in FIG. 6, the operation 350 includes additional operations. In operation 650, the selection module 260 generates a global score threshold for the first search query suggestion set. In some example embodiments, the selection module 260 generates the global score threshold as a relative threshold to limit the selectable query suggestions in each of the first search query suggestion set and the second search query suggestion set. The selection module 260 may generate a single global score threshold for both the first and second search query suggestion sets or may generate first and second global score thresholds for the first and second search query suggestion sets, respectively. The global score threshold may be set such that the first and second search query suggestion sets include the same or similar numbers of search query suggestions. In some example embodiments, the global score threshold may be a predetermined threshold determined to indicate an objective relevance of search query suggestions to a given query portion.

In operation 660, the selection module 260 determines one or more search query suggestions of the first search query suggestion set to exceed the global score threshold for inclusion in the first subset of search query suggestions. The selection module 260 may determine the search query suggestions exceeding the global score threshold by comparing the global score for each search query suggestion to the global score threshold. In some instances, the global scores may be normalized prior to determination of whether the global score exceeds the global score threshold.

In operation 670, the selection module 260 determines one or more search query suggestions of the second search query suggestion set to exceed the global score threshold for inclusion in the second subset of search query suggestions. Similar to the operation 660, the selection module 260 may determine which of the search query suggestions have a raw global score or a normalized global score exceeding the global score threshold. In some embodiments, the selection module 260 determines the one or more search query suggestions for inclusion using the global scoring function as well as additional factors such as a representation of a semantic relationship between the one or more search query suggestions and the query portion.

In various example embodiments, the operation 362 includes additional operations. In operation 680, the suggestion module 270 calculates a boosting factor for each search query suggestion within the second subset of search query suggestions included in the third search query suggestion set. Boosting may be understood as method of sorting the AQ such that the AQ takes into account the global score, reflecting how other users employ queries and receive query suggestions, as well as how a current user (e.g., the user 106) intends the query to be used. Calculation of the boosting factor may be understood as a boosting stage or a boosting function. The boosting stage may calculate the boosting factor for each query item in the second subset of search query suggestions (e.g., EQ'). The query item may be represented as q.bf (e.g., the boost factor of the query item) in the EQ'.

In operation 690, the suggestion module 270 determines the third order based on the boosting factor of each search query suggestion of the second subset of search query suggestions and the first set of global scores and the second set of global scores. An example embodiment of a boosting function for calculating the q.bf value may be:

$q.bf=qbf(q.tok,q.score,q.imp,otherFactors)$.

In some instances, q.bf is based on the factors of underlying tokens of the query item. As such, the q.bf is represented, in some embodiments, by $q.bf=\Sigma_t t_t.bf$. The suggestion module 270 may determine a boost factor for the tokens within the query item. For use in the second subset of search query suggestions, and the suggestion module 270 may employ a token boosting function. For example, a token boosting function, to determine a boost factor for a token, may be similar to the boosting function described above and represented by:

$t.bf=tbf(t.score,t.imp,otherFactors)$.

Based on boosting factor of a query item, the suggestion module 270 of the search enhancement system 150 may compute how many positions this query item is boosted (q.boostPos) from the bottom of autocomplete queue, according to an embodiment, as follows:

$q.boostPos=qbp(q.bf,otherFactors)$.

After determining the boosting factors for each query item in the second subset of search query suggestions, the suggestion module 270 determines the position of the query items. In some example embodiments, the suggestion module 270 determines the third order according to a function, such as:

$q.\,finalPos=qfp(q.boostPos,otherFactors)$.

In some example embodiments, the AQ length (e.g., number of autocomplete options) is ten. However, it will be understood that the AQ length may be any length, including a greater or fewer number of query items. The determination of the third order and placement of the query items within the third order intermingles query items of the NQ and the EQ' for presentation at the client device 110.

In some instances, a boosted rank, determined from the boost scores, of various query items may have the same boosted rank. The query items may be sorted by weighted scores with an importance (e.g., q.impScore) and select a sufficient number of query suggestions. Importance may be represented as:

$q.impScore=q.imp*q.gs$.

Once the final position for the query items has been established by the suggestion module 270, the presentation module 280 causes presentation of the third search query suggestion set (e.g., AQ) in operation 370, as discussed above.

By way of example, in performing one or more of the operations of methods 300, 500, and 600, the search enhancement system 150 may perform an exponential booster of importance algorithm. One or more of the operations of the methods 300, 500, and 600 may be represented by aspects of the algorithm described below.

In a first example, the user 106 is interested in Gucci products. The user 106 has already issued two queries, namely "Gucci" and "Gucci belt." These two queries are stored in the token pool, as in the operation 334, or within the token pool of the session history server 154. Upon issuing another query "shoe," as in operation 310, the search enhancement system 150 may generate an AQ as shown below. It should be noted that the AQ presented below may not be presented to the user 106 in the format shown below.

TABLE 1

| FIRST TOKEN SHOE | |
|---|---|
| NATIVE RESULTS | |
| RESULTS QUERY | SCORE |
| SHOES | 28901.0833 |
| SHOES MEN | 2122.0833 |
| SHOES WOMEN | 1909.75 |
| SHOE RACK | 846.4333 |
| SHOE | 810.1166 |

TABLE 1-continued

FIRST TOKEN SHOE

| | |
|---|---|
| SHOEI HELMET | 668.5166 |
| SHOE STRETCHER | 608.0166 |
| SHOEI | 555.499 |
| SHOE HORN | 488.833 |
| SHOE ORGANIZER | 442.9833 |

EXPONENTIAL BOOSTER WITH IMPORTANCE

| RESULT QUERY | SCORE | BOOSTED TOKENS | BOOST FACTOR |
|---|---|---|---|
| GUCCI SHOES | 3025.35 | [GUCCI 2] | 1.0 |
| GUCCI SHOES MEN | 315.2833 | [GUCCI 2] | 1.0 |
| SHOES | 28901.083 | [ ] | 0.0 |
| SHOES MEN | 2122.0833 | [ ] | 0.0 |
| SHOES WOMEN | 1909.75 | [ ] | 0.0 |
| SHOES RACK | 846.433 | [ ] | 0.0 |
| SHOE | 810.116 | [ ] | 0.0 |
| SHOEI HELMET | 668.516 | [ ] | 0.0 |
| SHOE STRETCHER | 608.016 | [ ] | 0.0 |
| SHOEI | 555.499 | [ ] | 0.0 |

| SESSION | TOP TOKENS |
|---|---|
| GUCCI | GUCCI 2 |
| GUCCI BELT | BELT 1 |

The native results may indicate the method 300, 500, or 600 having been partially performed, as in operations 320, 340, 620, and 640. As shown, after performing operation 320 or 620, the native results lack query suggestions related to or including Gucci, in some embodiments. The expansion result module 250 may perform the operations 340 or 640. The expansion result module 250 generates two query items "Gucci shoes" and "Gucci shoes men," which may be determined to have a higher relative relevance than the query suggestion of the native result module 220.

In a second example, the user 106 is interested in shoe models of NBA stars. The user 106 issues seven queries in sequence 1. "kd 6," 2. "Nike foamposite size 12," 3. "retro jordan size 12," 4. "Lebron size 12," 5. "Kd 6 size 12," 6. "Kobe 9 size 12," and 7. "Kobe 8 size 12." With respect to query 1, "kd 6," because there is no query in the session before the user 106 issues his first query, the search enhancement system 150 generates the same result with the expansion result module 250 as the native result module 220, as shown in Table 2 below.

TABLE 2

FIRST TOKEN SHOE

NATIVE RESULTS

| RESULTS QUERY | SCORE |
|---|---|
| KD 6 | 1925.3 |
| KD 6 CHRISTMAS | 227.133 |
| KD 6 BHM | 206.702 |
| KD6 | 166.166 |
| KD 6 ILLUSION | 97.016 |
| KD 6 AUNT PEARL | 88.8 |
| KD 6 ALL STAR | 88.583 |
| KD 6 METEOROLOGY | 77.9 |
| KD 6 N7 | 69.0833 |
| KD 6 TEXAS | 67.2166 |

TABLE 2-continued

FIRST TOKEN SHOE

EXPONENTIAL BOOSTER WITH IMPORTANCE

| RESULT QUERY | SCORE | BOOSTED TOKENS | BOOST FACTOR |
|---|---|---|---|
| KD 6 | 1925.3 | [ ] | 0.0 |
| KD 6 CHRISTMAS | 227.133 | [ ] | 0.0 |
| KD 6 BHM | 206.702 | [ ] | 0.0 |
| KD6 | 166.166 | [ ] | 0.0 |
| KD 6 ILLUSION | 97.016 | [ ] | 0.0 |
| KD 6 AUNT PEARL | 88.8 | [ ] | 0.0 |
| KD 6 ALL STAR | 88.583 | [ ] | 0.0 |
| KD 6 METEOROLOGY | 77.9 | [ ] | 0.0 |
| KD 6 N7 | 69.0833 | [ ] | 0.0 |
| KD 6 TEXAS | 67.2166 | [ ] | 0.0 |

With respect to query 2, "nike foamposite size 12," responsive to the receiver module 210 receiving the first token, "nike," from the user 106 for the second query, the comparison of autocomplete results may be as follows.

TABLE 3

NATIVE RESULTS

| RESULTS QUERY | SCORE |
|---|---|
| NIKE | 34964.6 |
| NIKE AIR MAX | 8255.08 |
| NIKE FOAMPOSITE | 6626.55 |
| NIKE SB | 5816.35 |
| NIKE SHOES | 5501.3 |
| NIKE SHOX | 3705.91 |
| NIKE FREE RUN | 3470.23 |
| NIKE AIR MAX 90 | 2780.03 |
| NIKE ROSHE RUN | 2730.36 |
| NIKE AIR FORCE 1 | 2458.42 |

EXPONENTIAL BOOSTER WITH IMPORTANCE

| RESULT QUERY | SCORE | BOOSTED TOKENS | BOOST FACTOR |
|---|---|---|---|
| NIKE KD | 869.5 | [KD 1] | 1.0 |
| NIKE KD 6 | 367.56 | [KD 1, 6 1] | 2.0 |
| NIKE | 34964.61 | [ ] | 0.0 |
| NIKE AIR MAX | 8255.08 | [ ] | 0.0 |
| NIKE FOAMPOSITE | 6626.55 | [ ] | 0.0 |
| NIKE SB | 5816.35 | [ ] | 0.0 |
| NIKE SHOES | 5501.3 | [ ] | 0.0 |
| NIKE SHOX | 3705.91 | [ ] | 0.0 |
| NIKE FREE RUN | 3470.23 | [ ] | 0.0 |
| NIKE AIR MAX 90 | 2780.03 | [ ] | 0.0 |

Because the user 106 has not shown any specific intention to search at the second query, the search enhancement system 150 acts in a learning stage or mode, according to various embodiments. As shown, in some embodiments, the search enhancement system 150 transitions between a learning stage and an inference stage. In the learning stage, the search enhancement system 150 may provide autocomplete suggestions based on the native result module 220. During the learning stage, the search enhancement system 150 may also store queries internally and build the token pool for the expansion result module 250. In some example embodiments, within a given session, the search enhancement system 150 may operate in and transition between the learning stage and the inference stage. In some instances, the search enhancement system 150 performs the learning stage intermittently (e.g., in a previous session or across multiple sessions).

With respect to query 3, "retro jordan size 12," the user 106 issues the first two tokens "retro" and "jordan." The search enhancement system 150 generates native and expanded results as in Table 4 below.

TABLE 4

NATIVE RESULTS

| RESULTS QUERY | SCORE |
| --- | --- |
| RETRO JORDANS | 2856.7 |
| RETRO JORDAN | 1016.28 |
| RETRO JORDAN SIZE 12 | 210.866 |
| RETRO JORDAN 11 | 138.583 |
| RETRO JORDANS SIZE 12 | 113.0 |
| RETRO JORDANS SIZE 9 | 100.233 |
| RETRO JORDAN 12 | 93.199 |
| RETRO JORDAN SIZE 13 | 93.31 |
| RETRO JORDANS SIZE 11 | 89.566 |
| RETRO JORDANS SIZE 7 | 84.716 |

EXPONENTIAL BOOSTER WITH IMPORTANCE

| RESULT QUERY | SCORE | BOOSTED TOKENS | BOOST FACTOR |
| --- | --- | --- | --- |
| RETRO JORDAN SIZE 12 | 210.866 | [12 1, SIZE 1] | 2.0 |
| RETRO JORDAN 12 | 93.1999 | [12 1] | 1.0 |
| RETRO JORDAN SIZE 13 | 92.316 | [SIZE 1] | 1.0 |
| RETRO JORDANS | 2856.7 | [ ] | 0.0 |
| RETRO JORDAN | 1016.283 | [ ] | 0.0 |
| RETRO JORDAN 11 | 138.583 | [ ] | 0.0 |
| RETRO JORDANS SIZE 12 | 113.0 | [ ] | 0.0 |
| RETRO JORDANS SIZE 9 | 100.233 | [ ] | 0.0 |
| RETRO JORDANS SIZE 11 | 89.566 | [ ] | 0.0 |
| RETRO JORDANS SIZE 7 | 84.716 | [ ] | 0.0 |

The search enhancement system 150 may capture the intention of the user 106 to search "retro jordan size 12" when the user 106 only enters "retro" and "jordan" into the search enhancement system 150 by the receiver module 210. This query item holds a comparatively better position (e.g., first position) in the results for the search enhancement system 150 (e.g., "Exponential Booster with Importance") than the native result set.

Referring now to query 4, "lebron size 12," the user 106 issues the first token "lebron" and the search enhancement system 150 captures the apparent intention to query "lebron size 12." The search enhancement system 150 positions the query in the first place, based on the inference of the user 106's intention, as shown below in Table 5.

TABLE 5

NATIVE RESULTS

| RESULTS QUERY | SCORE |
| --- | --- |
| LEBRON | 5708.316 |
| LEBRON 11 | 2844.733 |
| LEBRON 9 | 2721.016 |
| LEBRON 10 | 2617.516 |
| LEBRON JAMES | 994.466 |
| LEBRON SHOES | 869.35 |
| LEBRON 8 | 824.816 |
| LEBRON XI | 814.983 |
| LEBRON 11 CHRISTMAS | 445.516 |
| LEBRON JAMES AUTO | 415.5 |

EXPONENTIAL BOOSTER WITH IMPORTANCE

| RESULT QUERY | SCORE | BOOSTED TOKENS | BOOST FACTOR |
| --- | --- | --- | --- |
| LEBRON SIZE 12 | 210.866 | [12 2, SIZE 2] | 2.0 |
| LEBRON | 5708.316 | [ ] | 0.0 |
| LEBRON 11 | 2844.733 | [ ] | 0.0 |
| LEBRON 9 | 2721.016 | [ ] | 0.0 |
| LEBRON 10 | 2617.516 | [ ] | 0.0 |
| LEBRON JAMES | 994.466 | [ ] | 0.0 |
| LEBRON SHOES | 869.35 | [ ] | 0.0 |
| NIKE LEBRON | 1636.716 | [NIKE 1] | 0.466 |
| LEBRON 8 | 842.816 | [ ] | 0.0 |
| LEBRON XI | 814.983 | [ ] | 0.0 |

With respect to query 5, the user 106 issues the first two tokens "kd" and "6," and the search enhancement system 150 infers the intention of the user 106 to query "kd 6 size 12" and positions this query in the first position of the suggested query set. As illustrated below in Table 6, the native result module 220 does not necessarily provide the same inference based suggested query set.

TABLE 6

NATIVE RESULTS

| RESULTS QUERY | SCORE |
| --- | --- |
| KD 6 | 1925.3 |
| KD 6 CHIRSTMAS | 227.133 |
| KD 6 BHM | 206.702 |
| KD6 | 166.166 |
| KD 6 ILLUSION | 97.016 |
| KD 6 AUNT PEARL | 88.8 |
| KD 6 ALL STAR | 88.583 |
| KD 6 METEOROLOGY | 77.9 |
| KD 6 N7 | 69.083 |
| KD 6 TEXAS | 67.216 |

EXPONENTIAL BOOSTER WITH IMPORTANCE

| RESULT QUERY | SCORE | BOOSTED TOKENS | BOOST FACTOR |
| --- | --- | --- | --- |
| KD 6 SIZE 12 | 52.6 | [SIZE 3, 12 3] | 2.0 |
| KD 6 SIZE 11 | 57.083 | [SIZE 3] | 1.0 |
| KD 6 | 2844.733 | [ ] | 0.0 |
| KD 6 | 1925.3 | [ ] | 0.0 |
| KD 6 CHRISTMAS | 227.133 | [ ] | 0.0 |
| KD 6 BHM | 206.702 | [ ] | 0.0 |
| KD6 | 166.166 | [ ] | 0.0 |
| KD 6 ILLUSION | 97.016 | [ ] | 0.0 |
| KD 6 AUNT PEARL | 88.8 | [ ] | 0.0 |
| KD 6 ALL STAR | 88.583 | [ ] | 0.0 |
| KD 6 METEOROLOGY | 77.9 | [ ] | 0.0 |

Moving now to query 6, "kobe 9 size 12," the search enhancement system 150 generates the inference based search query suggestion set and places the inferred search at the top position in the expanded result set (e.g., boosted result set). The search enhancement system 150 captures the user 106's intention to query "kobe 9 size 12" in response to the user 106 entering "kobe" and "9," as shown below in Table 7.

TABLE 7

NATIVE RESULTS

| RESULTS QUERY | SCORE |
| --- | --- |
| KOBE 9 | 1847.667 |
| KOBE 9 ELITE | 457.916 |
| KOBE 9 MASTERPIECE | 349.467 |
| KOBE 9 ALL STAR | 148.383 |
| KOBE 9 MAESTRO | 121.916 |
| KOBE 9 ELITE | 57.699 |

TABLE 7-continued

| MASTERPIECE | | |
|---|---|---|
| KOBE9 | 52.416 | |
| KOBE 9.5 | 41.35 | |
| KOBE 9 ASG | 38.133 | |
| KOBE 9 DEVOTION | 33.316 | |

EXPONENTIAL BOOSTER WITH IMPORTANCE

| RESULT QUERY | SCORE | BOOSTED TOKENS | BOOST FACTOR |
|---|---|---|---|
| KOBE 9 SIZE 12 | 31.533 | [SIZE 4, 12 4] | 2.0 |
| KOBE 9 SIZE 11 | 26.816 | [SIZE 4] | 1.0 |
| KOBE 9 | 1847.667 | [ ] | 0.0 |
| KOBE 9 ELITE | 457.916 | [ ] | 0.0 |
| KOBE 9 MASTERPIECE | 349.467 | [ ] | 0.0 |
| KOBE 9 ALL STAR | 148.383 | [ ] | 0.0 |
| KOBE 9 MAESTRO | 121.916 | [ ] | 0.0 |
| KOBE 9 ELITE MASTERPIECE | 57.699 | [ ] | 0.0 |
| KOBE9 | 52.416 | [ ] | 0.0 |
| KOBE 9.5 | 41.35 | [ ] | 0.0 |

Finally, with respect to query 7, "kobe 8 size 12," when the user 106 enters "kobe" and "8," the search enhancement system 150 infers the intention to search for "kobe 8 size 12" in the query suggestion sets of both the native result module 220 and the expansion result module 250. However, the "kobe 8 size 12" suggested search is placed in a relatively higher position in the query suggestion set of the expansion result module 250.

TABLE 8

NATIVE RESULTS

| RESULTS QUERY | SCORE |
|---|---|
| KOBE 8 | 4890.133 |
| KOBE 8 CHRISTMAS | 561.233 |
| KOBE 8 SS | 261.233 |
| KOBE 8 PRELUDE | 182.416 |
| KOBE 8 SIZE 12 | 165.567 |
| KOBE 8 VENICE BEACH | 161.516 |
| KOBE 8 SYSTEM | 153.15 |
| KOBE 8 EASTER | 147.883 |
| KOBE 8 SIZE 11 | 146.766 |
| KOBE 8 SIZE 10 | 140.25 |

EXPONENTIAL BOOSTER WITH IMPORTANCE

| RESULT QUERY | SCORE | BOOSTED TOKENS | BOOST FACTOR |
|---|---|---|---|
| KOBE 8 SIZE 12 | 165.567 | [SIZE 5, 12 5] | 2.0 |
| KOBE 8 SIZE 9 | 120.383 | [SIZE 5, 9 1] | 1.7 |
| NIKE KOBE 8 SIZE 12 | 28.783 | [SIZE 5, 12 5, NIKE 1] | 2.233 |
| KOBE 8 | 4890.133 | [ ] | 0.0 |
| KOBE 8 CHRISTMAS | 561.233 | [ ] | 0.0 |
| KOBE 8 SS | 261.233 | [ ] | 0.0 |
| KOBE 8 PRELUDE | 182.416 | [ ] | 0.0 |
| KOBE 8 SIZE 12 | 165.567 | [ ] | 0.0 |
| KOBE 8 VENICE BEACH | 161.516 | [ ] | 0.0 |
| KOBE 8 SYSTEM | 153.15 | [ ] | 0.0 |
| KOBE 8 EASTER | 147.883 | [ ] | 0.0 |

As a result, one or more of the methodologies described herein may obviate a need for certain efforts or resources that otherwise would be involved in research, decision-making, online shopping, and more. Efforts expended by a user 106 in locating pertinent search results may be reduced and the search results may be more accurately determined based on the modules of the search enhancement system 150 and the associated methodologies described herein. Further, one or more of the methodologies described herein may provide autocomplete and search query suggestions tailored to the user 106 performing entering query items or tokens into a system associated with the search enhancement system 150. The methodologies disclosed herein may provide continually retailored suggestions to the user 106 based on additional queries and tokens being added to the session history of the user 106. Further, the methodologies of the present disclosure, combining suggestions based on global session histories and tailored suggestions based on the individual user history, may provide search query suggestions better interpreting the goals of the user 106 than would not have been done without the expansion result module 250. For example, one or more of the methodologies described herein may provide query suggestions unsupplied by standard autocomplete functions because a global score of the query suggestion was low based on specificity of the query, lack of popularity, newness of the query combination or results represented by the query combination. Further, one or more of the methodologies described herein provide for faster convergence in generation of search query suggestions. The response time of the methodologies provided is dynamically decreased by the search enhancement system 150 by manipulation of variables used by the expansion result module 250 to balance suitable rates of efficiency, inclusiveness, and timeliness of generation and presentation of the search suggestions.

Figure 7:
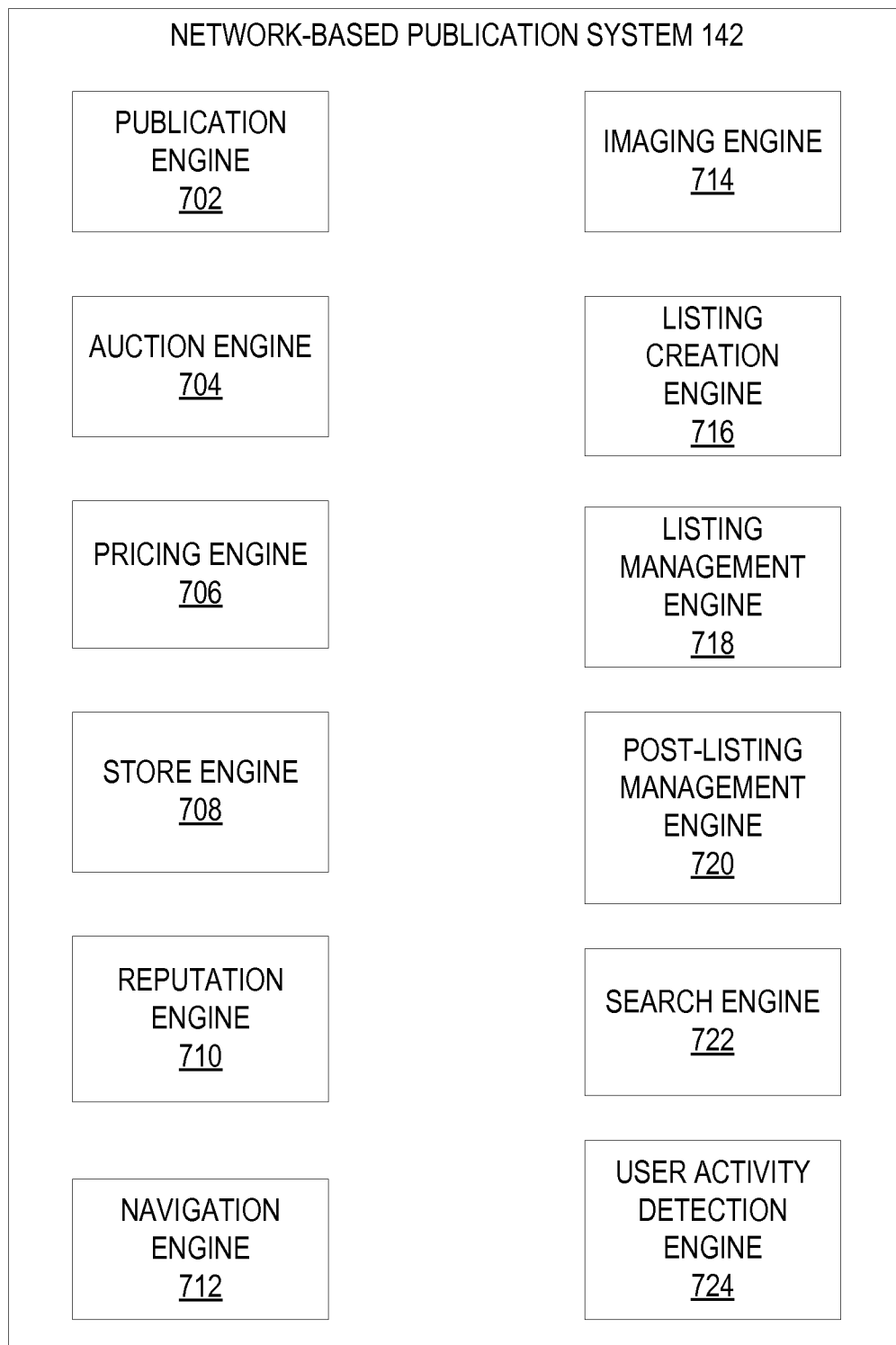
FIG. 7 is a block diagram illustrating components of an example network-based publication system, according to various embodiments.

FIG. 7 is an example block diagram illustrating multiple components that, in at least one embodiment, are provided within the publication system 142 of the network architecture 100 (e.g., a networked system). In this embodiment, the publication system 142 is a marketplace system where items (e.g., goods or services) may be offered for sale and that further implements the features described herein for interactive query generation and refinement. The items may comprise digital goods (e.g., currency, license rights). The publication system 142 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124, as shown in FIG. 1.

Returning to FIG. 7, the publication system 142 provides a number of publishing, listing, and price-setting mechanisms whereby a buyer may list (or publish information concerning) goods or services for sale, a buyer may express interest in or indicate a desire to purchase such goods or services, and a price may be set for a transaction pertaining to the goods or services. To this end, the publication system 142 may comprise at least one publication engine 702 and one or more auction engines 704 that support auction-format listing and price setting mechanisms (e.g., English, Dutch, Chinese, Double, Reverse auctions, etc.).

A pricing engine 706 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 708 allows a buyer to group listings within a "virtual" store, which may be branded and otherwise personalized by and for the buyer. Such a virtual store may also offer promotions, incentives, and features that are specific and personalized to the buyer. In one example, the buyer may offer a plurality of items as Buy-It-Now items in the virtual store, offer a plurality of items for auction, or a combination of both.

A reputation engine 710 allows users 106 that transact, utilizing the network architecture 100, to establish, build, and maintain reputations. These reputations may be made available and published to potential trading partners. Because the publication system 142 supports person-to-person trading between unknown entities, in accordance with one embodiment, users 106 may otherwise have no history or other reference information whereby the trustworthiness and credibility of potential trading partners may be assessed. The reputation engine 710 allows a user 106, for example, through feedback provided by one or more other transaction partners, to establish a reputation within the network-based publication system over time. Other potential trading partners may then reference the reputation for purposes of assessing credibility and trustworthiness.

Navigation of the network-based publication system may be facilitated by a navigation engine 712. For example, a browse module (not shown) of the navigation engine 712 allows users 106 to browse various category, catalog, or inventory data structures according to which listings may be classified within the publication system 142. Various other navigation applications within the navigation engine 712 may be provided to supplement the browsing applications. For example, the navigation engine 712 may include a communication module, similar to the communication module 290 described above.

In order to make listings available via the networked system as visually informing and attractive as possible, the publication system 142 may include an imaging engine 714 that enables users 106 to upload images for inclusion within publications and to incorporate images within viewed listings. The imaging engine 714 may also receive image data from a user 106 as a search query and utilize the image data to identify an item depicted or described by the image data.

A listing creation engine 716 allows users 106 (e.g., buyers) to conveniently author listings of items. In one embodiment, the listings pertain to goods or services that a user 106 (e.g., a buyer) wishes to transact via the network-based publication system 142. In other embodiments, a user 106 may create a listing that is an advertisement or other form of publication.

A listing management engine 718 allows the users 106 to manage such listings. Specifically, where a particular user 106 has authored or published a large number of listings, the management of such listings may present a challenge. The listing management engine 718 provides a number of features (e.g., auto-relisting, inventory level monitors) to assist the user 106 in managing such listings. The listing management engine 718 may include a listing module.

A post-listing management engine 720 also assists users 106 with a number of activities that typically occur post-listing. For example, upon completion of a transaction facilitated by the one or more auction engines 704, a buyer may wish to leave feedback regarding a particular seller. To this end, the post-listing management engine 720 provides an interface to the reputation engine 710 allowing the buyer to conveniently provide feedback regarding multiple sellers to the reputation engine 710. Another post-listing action may be shipping of sold items, whereby the post-listing management engine 720 may assist in printing shipping labels, estimating shipping costs, and suggesting shipping carriers.

A search engine 722 performs searches for publications in the networked-based publication system 142 that match a query. In example embodiments, the search engine 722 comprises a search module (not shown) that enables keyword searches of publications published via the network-based publication system 142. Further, for example, the search engine 722 may perform functions that were previously described in reference to the autocomplete server, the session history server 154 and the global score server 152. The functionality of the search engine 722 may be performed on one or more machines. In a further embodiment, the search engine 722 may take an image received by the imaging engine 714 as an input for conducting a search. The search engine 722 takes the query input and determines a plurality of matches from the network architecture 100 (e.g., publications stored in the database 126). It is noted that the functions of the search engine 722 may be combined with the navigation engine 712.

A user activity detection engine 724 in FIG. 7 may monitor user activity during user sessions and detect a change in the level of user activity that, as discussed in more detail below, may predict that a user 106 is about to make a purchase. The exact amount of change in the level of user activity may vary. A general guideline may be to monitor across multiple sessions and detect any significant increase over time (for example, the activity level doubling or tripling in a short span). In one embodiment, when the user activity detection engine 724 detects such a condition, the ecommerce system may make an intervention to provide incorporate the increased activity to weight tokens from the token pool of the user 106 in an effort to improve the probability that the user 106 is provided pertinent search query suggestions and will make a purchase, or also to motive the user 106 to make the purchase on the ecommerce system site instead of moving to a competitor site in search of a better purchase. Stated another way, activity over time and at different times before a purchase action provides an opportunity to personalize search query suggestions to a user 106, based on time, by intervention through inclusion as a weighted factor in the methodologies discussed above.

Although the various components of the network-based publication system 142 have been defined in terms of a variety of individual modules and engines, a skilled artisan will recognize that many of the items may be combined or organized in other ways and that not all modules or engines need to be present or implemented in accordance with example embodiments. Furthermore, not all components of the network-based publication system 142 have been included in FIG. 7. In general, components, protocols, structures, and techniques not directly related to functions of exemplary embodiments (e.g., dispute resolution engine, loyalty promotion engine, personalization engines) have not been shown or discussed in detail. The description given herein simply provides a variety of exemplary embodiments to aid the reader in an understanding of the systems and methods used herein.

Modules, Components, and Logic

Certain embodiments are described herein as including logic or a number of components, modules, or mechanisms. Modules may constitute either hardware-software modules (e.g., hardware temporarily or permanently configured to perform a specialized function by code embodied on the hardware or a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware-software module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a programmable processor. Once configured by such software, the hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the various embodiments of the present disclosure in different contexts from the disclosure contained herein.

Software Architecture

Figure 8:
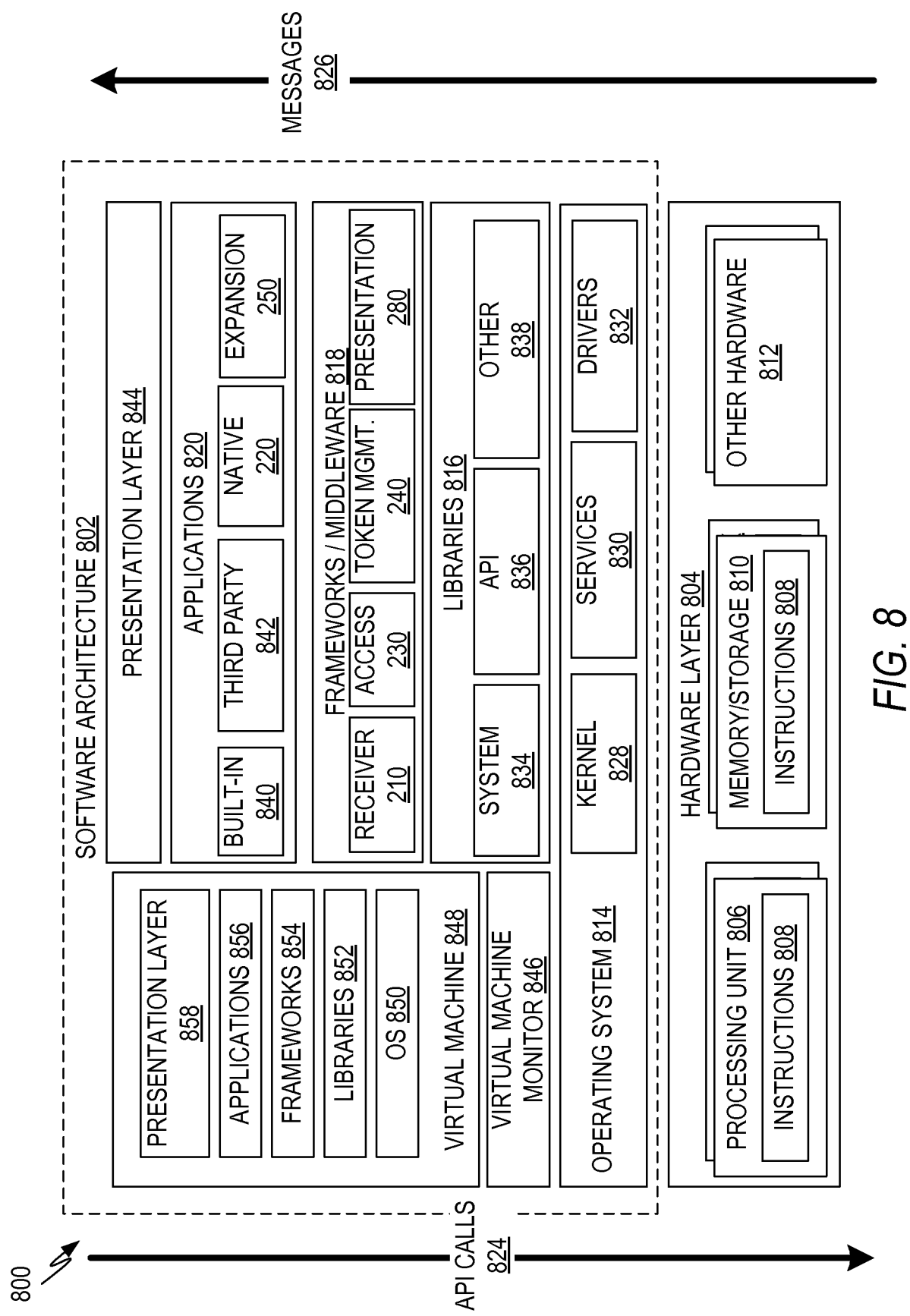
FIG. 8 is a block diagram illustrating an example of a software architecture that may be installed on a machine, according to various embodiments.

FIG. 8 is a block diagram 800 illustrating a representative software architecture 802, which may be used in conjunction with various hardware architectures herein described. FIG. 8 is merely a non-limiting example of a software architecture and it will be appreciated that many other architectures may be implemented to facilitate the functionality described herein. The software architecture 802 may be executing on hardware such as machine 1000 of FIG. 10 that includes, among other things, processors 1010, memory 1030, and I/O components 1050. A representative hardware layer 804 is illustrated and can represent, for example, the machine 1000 of FIG. 10. The representative hardware layer 804 comprises one or more processing units 806 having associated executable instructions 808. Executable instructions 808 represent the executable instructions of the software architecture 802, including implementation of the methods, modules and so forth of FIGS. 1-7. Hardware layer 804 also includes memory or storage modules 810, which also have executable instructions 808. Hardware layer 804 may also comprise other hardware as indicated by 812 which represents any other hardware of the hardware layer 804, such as the other hardware illustrated as part of machine 1000.

In the example architecture of FIG. 8, the software architecture 802 may be conceptualized as a stack of layers where each layer provides particular functionality. For example, the software 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth, illustrated as messages 826, in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

In various embodiments, instructions 808 for implementing (e.g., configuring hardware to perform above-specified functions) one or more of the receiver module 210, the access module 230, the token management module 240, the presentation module 280, and the communication module 290 are implemented within the frameworks/middleware 818. In these embodiments, the instructions 808 of the above-referenced modules may interact with one or more modules implemented at the application layer and one or more hardware component (e.g., a display, a port or communication component, one or more memory or server). In some instances, instructions 808 implementing portions of all of the modules of the search enhancement system 150 are implemented at the frameworks/middleware layer 818, and instructions 808 for portions of one or more of the modules are implemented at the application layer 820. For example, instructions 808 for portions of the native results module 220 and the expansion results module 250 may be implemented in one or more of the framework/middleware 818 and the application layer 820.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 816 may provide a common infrastructure that may be utilized by the applications 820 or other components or layers. The libraries 816 typically provide functionality that allows other modules to perform tasks in an easier fashion than to interface directly with the underlying operating system 814 functionality (e.g., kernel 828, services 830 or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG, graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 or other software components/modules, some of which may be specific to a particular operating system 814 or platform.

The applications 820 include built-in applications 840 or third party applications 842. Examples of representative built-in applications 840 may include, but are not limited to, a contacts application, a browser application, a book reader application, a location application, a media application, a messaging application, or a game application. Third party applications 842 may include any of the built in applications as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system 834, APIs 836, and other libraries 838), and/or frameworks/middleware 818 to create user interfaces to interact with users 106 of the system. Alternatively, or additionally, in some systems interactions with a user 106 may occur through a presentation layer, such as presentation layer 844. In these systems, the application/module "logic" can be separated from the aspects of the application/module that interact with a user 106.

Some software architectures utilize virtual machines. In the example of FIG. 8, this is illustrated by virtual machine 848. A virtual machine 848 creates a software environment where applications/modules can execute as if they were executing on a hardware machine (such as the machine 1000 of FIG. 10, for example). A virtual machine 848 is hosted by a host operating system (operating system 814 in FIG. 10) and typically, although not always, has a virtual machine monitor 846, which manages the operation of the virtual machine 848 as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Data Structures

Figure 9:
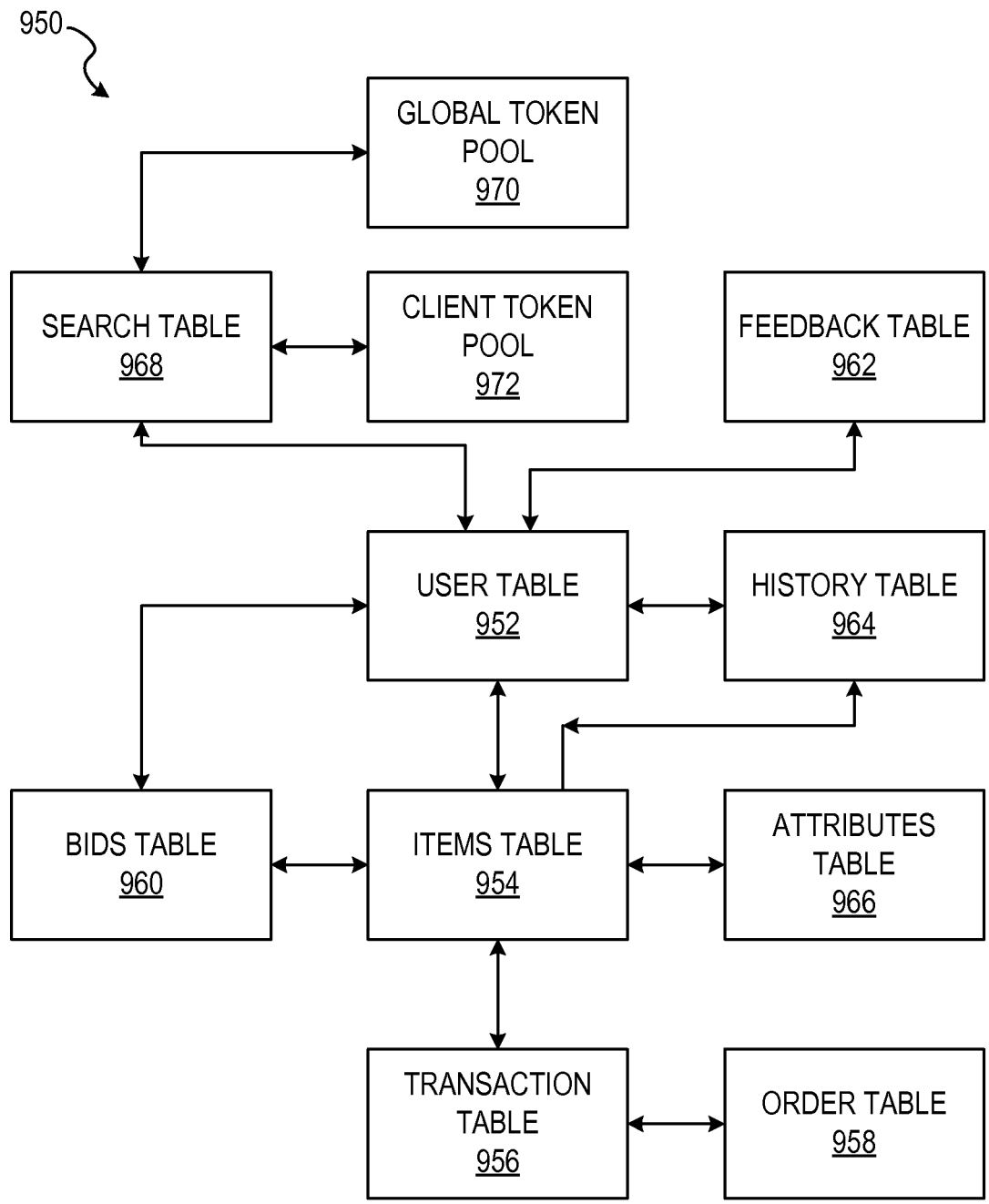
FIG. 9 is a block diagram illustrating a high-level entity-relationship diagram, according to various embodiments.

FIG. 9 is a high-level entity-relationship diagram, illustrating various tables 950 that may be maintained within the databases 126 of FIG. 1, and that are utilized by and support the network-based publication system 142 and payment system 144, both of FIG. 1. A user table 952 may contain a record for each of the registered users 106 of the network architecture 100 (e.g., network-based publication system) of FIG. 1. A user 106 may operate as a seller, a buyer, or both, within a marketplace within the network-based publication system. In one example embodiment, a buyer may be a user 106 that has accumulated value (e.g., commercial or proprietary currency), and is accordingly able to exchange the accumulated value for items that are offered for sale by the network-based publication system.

The tables 950 may also include an items table 954 in which item records (e.g., listings) are maintained for goods and services (e.g., items) that are available to be, or have been, transacted via the network-based publication system. Item records (e.g., listings) within the items table 954 may furthermore be linked to one or more user records within the user table 952, so as to associate a seller and one or more actual or potential buyers with an item record (e.g., listing).

A transaction table 956 may contain a record for each transaction (e.g., a purchase or sale transaction or auction) pertaining to items for which records exist within the items table 954.

An order table 958 may be populated with order records, with each order record being associated with an order. Each order, in turn, may be associated with one or more transactions for which records exist within the transaction table 956.

Bid records within a bids table 960 may relate to a bid received at the network-based publication system in connection with an auction-format listing supported by the auction engine(s) 704 of FIG. 7. A feedback table 962 may be utilized by one or more reputation engines 710 of FIG. 7, in one example embodiment, to construct and maintain reputation information concerning users 106 in the form of a feedback score. A history table 964 may maintain a history of transactions to which a user 106 has been a party. One or more attributes tables 966 may record attribute information that pertains to items for which records exist within the items table 954. Considering only a single example of such an attribute, the attributes tables 966 may indicate a currency attribute associated with a particular item, with the currency attribute identifying the currency of a price for the relevant item as specified by a seller. A search table 968 may store search information that has been entered by a user 106 (e.g., a buyer) who is looking for a specific type of listing. The search table 968 may include or otherwise communicate with one or more data tables in the form of a global token pool table 970 and a client token pool table 972. The global token pool table 970 may be a data table or other data structure storing information representative of the global token pool, described above. The client token pool table 972 may be a data table or other data structure storing information representative of the token pool of the user 106, described above.

Example Machine Architecture and Machine-Readable Medium

Figure 10:
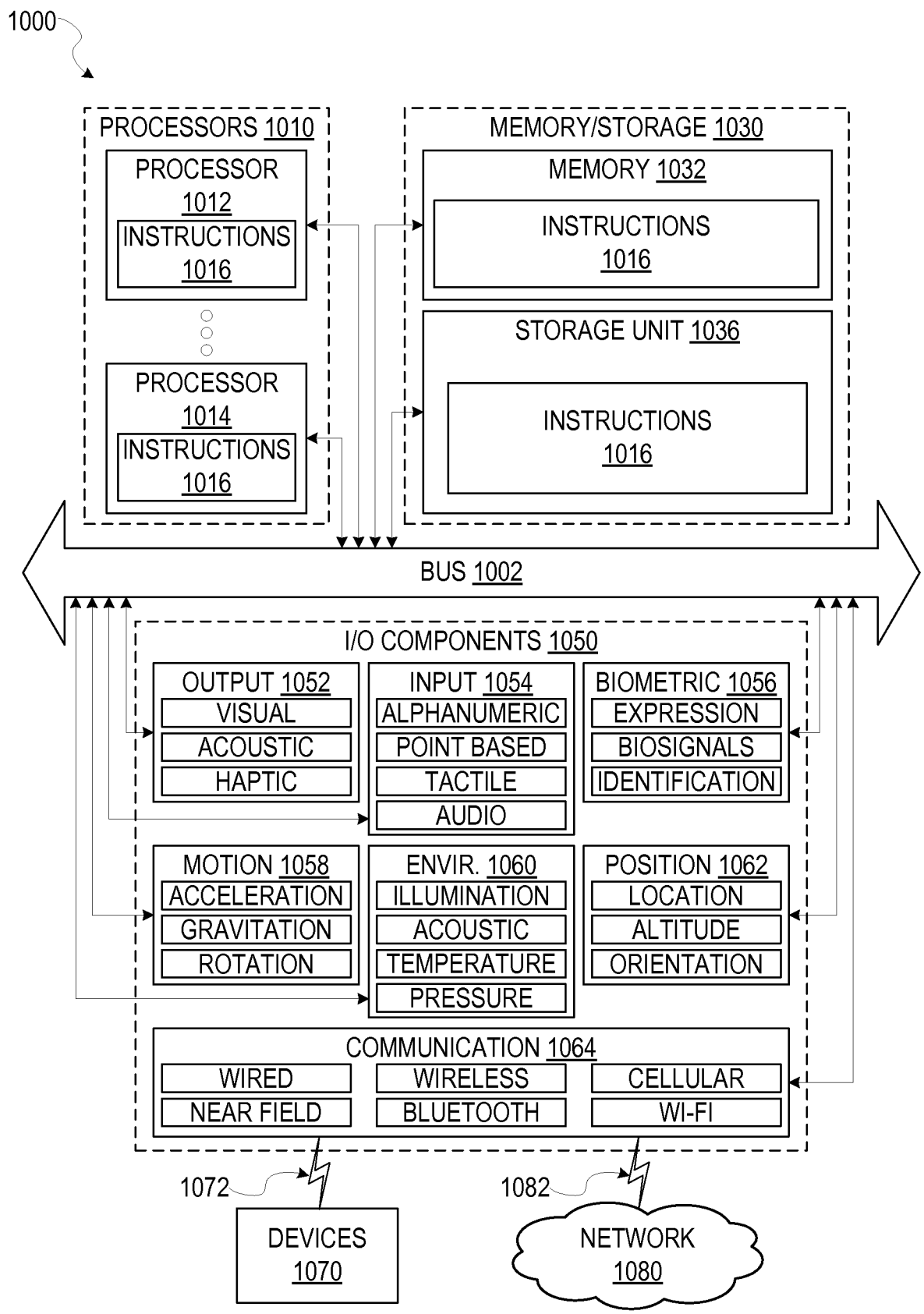
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions 1016 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the flow diagrams of FIGS. 3-6. Additionally, or alternatively, the instructions 1016 may implement the receiver module 210, the native result module 220, the access module 230, the token management module 240, the expansion result module 250, the selection module 260, the suggestion module 270, the presentation module 280, and the communication module 290 of FIGS. 1-6, and so forth. The instructions 1016 transform the general, non-programmed machine 1000 into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. In various embodiments, the machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1012 and processor 1014 that may execute instructions 1016. The term "processor" is intended to include multi-core processor 1010 that may comprise two or more independent processors 1012, 1014 (sometimes referred to as "cores") that may execute instructions 1016 contemporaneously. Although FIG. 10 shows multiple processors 1012, 1014, the machine 1000 may include a single processor 1010 with a single core, a single processor 1010 with multiple cores (e.g., a multi-core process), multiple processors 1010 with a single core, multiple processors 1010 with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor 1010's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions 1016 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless specifically stated otherwise, discussions herein using words such as "processing," "computing," "calculating," "determining," "presenting," "displaying," or the like, may refer to actions or processes of a machine 1000 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method, comprising:
   receiving, by a server device, at least a query portion from a client device to conduct a search based at least in part on the received query portion;
   generating, by the server device, at least a first search query suggestion based at least in part on a determination that at least the received query portion corresponds to at least one token portion stored in a token pool that includes a plurality of tokens generated by the server device;

generating, by the server device, at least a second search query suggestion that includes at least a portion of the generated first search query suggestion and at least a portion of a session history associated with the client device; and communicating, by the server device, at least the generated first and second search query suggestions to the client device responsive to the received query portion.

2. The method of claim 1, wherein a first portion of the plurality of tokens was generated by the server device based at least in part on a first search query received from a different client device prior to the received token portion.

3. The method of claim 2, wherein a second portion of the plurality of tokens was generated by the server device based at least in part on a second search query received from the client device prior to the received token portion, each generated token in the second portion of the plurality of tokens being associated with the client device.

4. The method of claim 3, wherein a third portion of the plurality of tokens was generated by the server device based at least in part on one or more words included in a token reference.

5. The method of claim 3, wherein each token included in the first and second portions of the plurality of tokens was generated by the server device based on a corresponding received search query having been parsed by the server device.

6. The method of claim 5, wherein each generated token included in at least the first portion of the plurality of tokens is further associated with a token quality determined by the server device based at least in part on a recorded feature of the generated token.

7. The method of claim 6, wherein a feature of the generated token includes any one of a duration that a corresponding query portion was employed in one or more sessions between the client device and the server device, a frequency that the corresponding query portion was received by the server device, or a time that the corresponding query portion was received by the server device.

8. The method of claim 6, wherein the session history associated with the client device includes a history of search queries received from the client device.

9. The method of claim 1, wherein at least the first and second search query suggestions are communicated to the client device based further in part on a selection thereof from a merged list of generated search query suggestions, wherein the merged list includes at least the generated first search query suggestion and at least the generated second search query suggestion, the selection being made based at least in part on a global score determined for at least a portion of the generated search query suggestions included in the merged list.

10. The method of claim 1, wherein at least the generated first and second search query suggestions are communicated to the client device based further on a determination that the second search query suggestion has a higher relevance score than the first search query suggestion.

11. The method of claim 1, wherein the second search query suggestion is generated based further on one of a prepending or appending of at least a portion of the session history to the received query portion.

12. A computerized system, comprising:
a receiving module configured to receive at least a query portion from a client device;
a token access module configured to access a token pool associated with the client device, the token pool including a plurality of tokens that were each generated based on search queries received from the client device prior to the received query portion;
a suggestion generation module configured to generate at least a first search query suggestion and at least a second search query suggestion, the first search query suggestion being generated based at least in part on a determination that at least the received query portion corresponds to at least one token portion stored in the token pool, the second search query suggestion being generated to include at least a portion of the generated first search query suggestion and at least a portion of a session history associated with the client device;
a merge module configured to merge at least the first generated search query suggestion and at least the second generated search query suggestion into a merged list of search query suggestions;
an organization module configured to order the merged list of search query suggestions based at least in part on determined scores; and
a presentation module configured to cause presentation of at least the first and second generated search query suggestions on the client device based at least in part on a determination that the first and second generated search query suggestions each have a corresponding score above a defined threshold.

13. The system of claim 12, further comprising:
a token management module configured to determine a token quality for each generated token of the token pool based at least in part on a recorded feature of the generated token.

14. A non-transitory machine-readable storage medium comprising processor executable instructions that, when executed by a processor of a machine, cause the machine to perform operations comprising:
receiving at least a query portion from a client device to conduct a search based at least in part on the received query portion;
generating at least a first search query suggestion based at least in part on a determination that at least the received query portion corresponds to at least a first token portion stored in a first token pool that includes a first plurality of generated tokens, wherein the each token in the first token pool was generated based at least in part on a first search query received from the client device;
generating at least a second search query suggestion that includes at least a portion of the generated first search query suggestion and at least a portion of a session history associated with the client device; and
communicating at least the generated first and second search query suggestions to the client device as a response to the received query portion.

15. The non-transitory machine-readable storage medium of claim 14, wherein the first search query suggestion is generated based further in part on a second determination that at least the received query portion corresponds to at least a second token portion stored in a second token pool that includes a second plurality of generated tokens, wherein each token in the second token pool was generated based at least in part on a second search query received from a different client device.

16. The non-transitory machine-readable storage medium of claim 15, wherein the first search query suggestion is generated based further in part on a third determination that at least the received query portion corresponds to at least a third token portion stored in a third token pool that includes a third plurality of generated tokens, wherein each token in the third token pool was generated based at least in part on one or more words extracted from a token reference.

17. The non-transitory machine-readable storage medium of claim 14, wherein each token included in at least the first token pool is associated with a token quality determined based at least in part on a recorded feature of the generated token.

18. The non-transitory machine-readable storage medium of claim 14, wherein a feature of the generated token includes any one of a duration that a corresponding query portion was employed in one or more prior sessions with the client device, a frequency that the corresponding query portion was received from the client device, or a time that the corresponding query portion was received from the client device.

19. The non-transitory machine-readable storage medium of claim 14, wherein at least the generated first and second search query suggestions are communicated to the client device based further in part on the generated first and second search query suggestions being selected from a merged list of generated search query suggestions, the selection being made based on a global score determined for at least a portion of the generated search query suggestions included in the merged list.

* * * * *